United States Patent
Ando et al.

(10) Patent No.: US 9,803,064 B2
(45) Date of Patent: *Oct. 31, 2017

(54) COLORED RESIN PARTICLE DISPERSION AND INKJET INK

(71) Applicant: RISO KAGAKU CORPORATION, Tokyo (JP)

(72) Inventors: Kazuyuki Ando, Ibaraki (JP); Yoshifumi Watanabe, Ibaraki (JP); Manami Shimizu, Ibaraki (JP)

(73) Assignee: RISO KAGAKU CORPORATION, Tokyo (JP)

( * ) Notice: Subject to any disclaimer, the term of this patent is extended or adjusted under 35 U.S.C. 154(b) by 86 days.

This patent is subject to a terminal disclaimer.

(21) Appl. No.: 14/597,909

(22) Filed: Jan. 15, 2015

(65) Prior Publication Data

US 2015/0197653 A1 Jul. 16, 2015

(30) Foreign Application Priority Data

Jan. 16, 2014 (JP) .................. 2014-005726

(51) Int. Cl.
| | |
|---|---|
| C08K 5/17 | (2006.01) |
| C08K 5/521 | (2006.01) |
| C09B 67/08 | (2006.01) |
| C09D 11/023 | (2014.01) |
| C09D 11/32 | (2014.01) |
| C09D 11/36 | (2014.01) |
| C09D 129/04 | (2006.01) |
| G03G 9/093 | (2006.01) |
| G03G 9/12 | (2006.01) |

(52) U.S. Cl.
CPC .............. *C08K 5/17* (2013.01); *C08K 5/521* (2013.01); *C09B 67/0013* (2013.01); *C09D 11/023* (2013.01); *C09D 11/32* (2013.01); *C09D 11/36* (2013.01); *C09D 129/04* (2013.01); *G03G 9/093* (2013.01); *G03G 9/12* (2013.01)

(58) Field of Classification Search
CPC ........ C08K 5/17; C08K 5/521; C09D 129/04; C09D 11/32; C09D 11/36; C09D 11/023; G03G 9/093; G03G 9/12; C09B 67/0013
See application file for complete search history.

(56) References Cited

U.S. PATENT DOCUMENTS

| | | |
|---|---|---|
| 3,383,352 A | 5/1968 | Gillian Duell et al. |
| 4,680,058 A | 7/1987 | Shimizu et al. |
| 4,762,568 A | 8/1988 | Nakamura et al. |
| 5,447,561 A | 9/1995 | Chiba et al. |
| 6,395,805 B1 | 5/2002 | Takao |
| 6,916,365 B1 | 7/2005 | Casper |
| 8,329,761 B2 | 12/2012 | Nair et al. |
| 2004/0006158 A1 | 1/2004 | Horie et al. |
| 2004/0147633 A1 | 7/2004 | Kamikubo et al. |
| 2004/0195711 A1 | 10/2004 | Hayashi et al. |
| 2007/0189998 A1 | 8/2007 | Nair et al. |
| 2009/0238606 A1 | 9/2009 | Ueno et al. |
| 2011/0009537 A1 | 1/2011 | Kotera et al. |
| 2011/0046298 A1 | 2/2011 | Hosoya et al. |
| 2011/0305880 A1* | 12/2011 | Nakamura ........... C09D 11/101 428/195.1 |
| 2012/0141747 A1 | 6/2012 | Deeter et al. |
| 2012/0266779 A1 | 10/2012 | Morinaga et al. |
| 2012/0289673 A1 | 11/2012 | Tsai et al. |
| 2013/0197144 A1 | 8/2013 | Katoh et al. |
| 2015/0197648 A1* | 7/2015 | Watanabe .............. C09D 11/36 524/32 |
| 2015/0197652 A1* | 7/2015 | Ando .................... C09D 11/023 106/31.86 |
| 2015/0197666 A1* | 7/2015 | Shimizu ................ C09D 11/36 524/127 |

FOREIGN PATENT DOCUMENTS

| | | |
|---|---|---|
| CN | 1435699 | 8/2003 |
| CN | 1517414 | 1/2004 |
| CN | 101273098 | 9/2008 |
| CN | 101539730 | 9/2009 |
| CN | 101760042 | 6/2010 |
| CN | 102015924 | 4/2011 |

(Continued)

OTHER PUBLICATIONS

Chinese Official Action, dated Jun. 28, 2016, Chinese Patent Application No. 201510020731.7 (7 pages).
Chinese Official Action, dated Jul. 1, 2016, Chinese Patent Application No. 201510020695.4 (7 pages).
Chinese Official Action, dated Jun. 29, 2016, Chinese Patent Application No. 201510020653.0 (6 pages).
Chinese Official Action, dated Jun. 28, 2016, Chinese Patent Application No. 201510020767.5 (6 pages).

(Continued)

*Primary Examiner* — Patrick Niland

(74) *Attorney, Agent, or Firm* — Hamre, Schumann, Mueller & Larson, P.C.

(57) ABSTRACT

A colored resin particle dispersion and an ink are provided which yield excellent abrasion resistance and prevent change in the color tone. Moreover, a colored resin particle dispersion and an inkjet ink are provided which exhibit excellent abrasion resistance, together with excellent water resistance and marker resistance. Specifically provided is a colored resin particle dispersion containing colored resin particles, a basic dispersant, and a non-aqueous solvent, wherein the colored resin particles include a colorant, a solid resin and a liquid organic compound having an acidic group, and the oxidation-reduction potential of the colored resin particle dispersion is 300 mV or less. Also provided is an inkjet ink containing this colored resin particle dispersion.

7 Claims, No Drawings

(56) References Cited

FOREIGN PATENT DOCUMENTS

| | | |
|---|---|---|
| CN | 102137891 | 7/2011 |
| JP | 62-500597 | 3/1987 |
| JP | 8-234502 A | 9/1996 |
| JP | 2001-031900 | 2/2001 |
| JP | 2002-047440 | 2/2002 |
| JP | 2004-018736 | 1/2004 |
| JP | 2005-126587 | 5/2005 |
| JP | 2005-255911 | 9/2005 |
| JP | 2006-008849 | 1/2006 |
| JP | 2006-008850 | 1/2006 |
| JP | 2006-193648 | 7/2006 |
| JP | 2006-232990 | 9/2006 |
| JP | 2007-197632 | 8/2007 |
| JP | 2007-197633 | 8/2007 |
| JP | 2007-231106 A | 9/2007 |
| JP | 2007-231107 A | 9/2007 |
| JP | 2009-126995 | 6/2009 |
| JP | 2009-128741 | 6/2009 |
| JP | 2009-242649 A | 10/2009 |
| JP | 2009-249598 | 10/2009 |
| JP | 2010-033000 | 2/2010 |
| JP | 2010-270225 A | 12/2010 |
| JP | 2011-095643 | 5/2011 |
| JP | 2012-11740 | 1/2012 |
| JP | 2012-107229 A | 6/2012 |
| JP | 2012-224781 A | 11/2012 |
| JP | 2012-533650 A | 12/2012 |
| JP | 2014-19770 A | 2/2014 |
| JP | 2015-134852 | 7/2015 |
| JP | 6077772 B | 2/2017 |
| WO | 2004/003091 | 1/2004 |
| WO | 2011/144671 | 11/2011 |
| WO | 2013/005019 | 1/2013 |

OTHER PUBLICATIONS

Chinese Official Action, dated Jun. 28, 2016, Chinese Patent Application No. 201510020738.9 (6 pages).
Definition of dye. Collins English Dictionary. http://www.collinsdictionary.com/dictionary/english/dye. As viewed on Mar. 17, 2016. (3 pages).
Definition of colorant. Hawley's Condensed Chemical Dictionary. John Wiley & Sons, Inc. 2007. (2 pages).
Guemelli, S.; Lagana, M.F.; Mezzina, E.; Ferroni, F.; Siani, G.; Spinelli, D. "Supramolecular complex formation: A study of the interactions between b-cyclodextrin and some different classes of organic compounds by ESI-MS, surface tension measurements, and UV/Vis and 1H NMR spectroscopy". European Journal of Chemistry, 2003, pp. 4765-4776.
Machine Translation of JP2009-249598A. Oct. 29, 2009 (8 pages).
Auschra, C.; Eckstein, E.; Knishka, R.; Pirrung, F.; Harbers, P. "Controlled polymers for pigment dispersants". European Coatings Journal. 2004. Issue 6. (9 pages).
Non-final Office Action dated Mar. 30, 2016, for U.S. Appl. No. 14/596,732, filed Jan. 14, 2015. (47 pages).
Search Report dated Jun. 8, 2015 in corresponding European patent application No. 15151104.5, 6 pages total.
Search Report dated Jun. 5, 2015 in corresponding European patent application No. 15151108.6, 5 pages total.
Search Report dated May 29, 2015 in corresponding European patent application No. 15151103.7, 5 pages total.
Search Report dated Jun. 12, 2015 in corresponding European patent application No. 15151105.2, 4 pages total.
Search Report dated Jun. 10, 2015 in corresponding European patent application No. 15151106.0, 4 pages total.
Sunohara et al., "Preparation of polyvinylpyrrolidone fine particles by inverse emulsification-evaporation process in solvent," Kobunshi Ronbunshu, 2005, vol. 62, No. 7, pp. 310-315 (English language abstract provided).
Non-final Office Action dated Nov. 25, 2016 for U.S. Appl. No. 14/598,947, filed Jan. 16, 2015 (30 pages).
Official Action for Japanese Patent Application No. 2014-005731, dated Feb. 21, 2017 (3 pages).
Japanese Official Action, Japanese Patent Application No. 2014-005726, dated Feb. 28, 2017 (3 pages).
Final Office Action dated Nov. 10, 2016 for U.S. Appl. No. 14/596,732, filed Jan. 15, 2015 (40 pages).
Meislich, H. "Schaum's Outline of Theory and Problems of Organic Chemistry", 3rd Ed. New York: McGraw-Hill Professional, 1999, 3rd ed. (Schaum's Outline Series), ISBN: 9780071341653, pp. 42-45.
"Walsroder solubility", Dow Answer Center, http://dowac.custhelp.com/app/answers/detail/a_id/8344/~/walsroder-solubility, As viewed on Oct. 21, 2016.
Official Action, Japanese Patent Application No. 2014-005732; dated Apr. 25, 2017, (2 pages).
Official Action, Japanese Patent Application No. 2014-005729, dated May 16, 2017 (2 pages).
Final Office Action dated May 24, 2017, U.S. Appl. No. 14/597,942, filed Jan. 15, 2015 (32 pages).
Disperbyk 106 material data safety shee. Byk additives and instruments. Jun. 1, 2016 (10 pages).
U.S. Office Action. U.S. Appl. No. 14/596732, dated Jun. 6, 2017 (43 pages).
Official Action, Japanese Patent Application No. 2014-005753, dated Jul. 4, 2017 (3 pages).
"Ricca Chemical Company Oxidation-Reduction Potential (ORP)", Jul. 12, 2005 (1 page), Available online at: URL: http://www.riccachemical.com/Documents/TRD19.pdf.
Official Action, European Patent Application No. 15151104.5, dated Aug. 7, 2017 (4 pages).

* cited by examiner

COLORED RESIN PARTICLE DISPERSION AND INKJET INK

CROSS REFERENCE TO RELATED APPLICATIONS

This application is based upon and claims the benefit of priority from prior Japanese Patent Applications No. 2014-005726 filed on Jan. 16, 2014, the entire contents of which are incorporated by reference herein.

BACKGROUND OF THE INVENTION

Field of the Invention

The present invention relates to a colored resin particle dispersion and an inkjet ink.

Description of the Related Art

The colorants for printing inks can be broadly classified into dyes and pigments. Using a dye offers the advantage of particularly favorable color development. Further, compared with pigments, dyes offer the advantage of superior abrasion resistance, and particularly superior rub fastness. However, dyes themselves exhibit inferior water resistance and marker resistance. On the other hand, pigments offer the advantages of high image density and excellent weather resistance, but exhibit inferior abrasion resistance, and particularly rub fastness, compared with dyes.

In light of these properties, a method has been proposed in which by encapsulating the colorant within a resin to form colored resin particles, an ink can be provided which exhibits excellent abrasion resistance, water resistance and marker resistance, while retaining the image-forming properties of the colorant. It is desirable that the resin has properties which impart the ink with abrasion resistance, water resistance and marker resistance.

Patent Document 1, Patent Document 2 and Non-Patent Document 1 each proposes the production of a polymer particle dispersion in which by using an organic solvent A and an organic solvent B having almost no compatibility with the organic solvent A, forming a dispersion composed of a dispersed phase containing the organic solvent B and a resin and a continuous phase containing the organic solvent A, and then removing the organic solvent B from the dispersion under reduced pressure or heating, a polymer particle dispersion is produced containing polymer particles dispersed in the organic solvent A.

In other words, a method is proposed in which a liquid, prepared by dissolving and incorporating within the organic solvent B a resin that does not dissolve in the organic solvent A, is dispersed within a continuous phase of the organic solvent A, and the organic solvent B is then removed under reduced pressure or heating, thus obtaining a polymer particle dispersion in which polymer particles are dispersed stably within the organic solvent A.

In terms of the resin for the dispersed phase, styrene-maleic acid copolymer resins are used in the examples of Patent Document 1, styrene-maleic acid copolymer resins and polyvinylpyrrolidone are used in the examples of Patent Document 2, and polyvinylpyrrolidone is used in Non-Patent Document 1. These resins include resins having polar groups that undergo negative dissociation and resins having polar groups that undergo positive dissociation, thus forming polymer particles having negative and positive charges, and providing stable dispersions.

Patent Document 3 proposes the production of a polymer particle dispersion in which by using an organic solvent A and an organic solvent B having almost no compatibility with the organic solvent A, forming a dispersion composed of a dispersed phase containing the organic solvent B, a polyfunctional monomer or resin and a polymerization initiator, and a continuous phase containing the organic solvent A, subsequently initiating a crosslinking reaction by light or heat, and then removing the organic solvent B from the dispersion under reduced pressure or heating, a polymer particle dispersion is produced containing polymer particles dispersed in the organic solvent A.

Based on the above documents, it is hoped that polymer particle dispersions will enable the stable dispersion of polymer particles from the nano level to the micro level, for use as coloring materials not only in inks and copy toners, but also within all manner of coating materials, colored liquid crystals, color filters for portable terminals, electronic books and electronic papers.

[Patent Document 1] JP 2007-197632 A
[Patent Document 2] JP 2005-255911 A
[Patent Document 3] JP 2007-197633 A
[Non-Patent Document 1] Japanese Journal of Polymer Science and Technology, Vol. 62, No. 7, pp. 310 to 315 (July, 2005)

However, no investigations were conducted in the above documents regarding the abrasion resistance, the water resistance and the marker resistance of images printed on paper or the like when a printing ink was prepared using the above types of polymer particle dispersions. Obtaining satisfactory abrasion resistance for the image simply by adding a resin is difficult. Further, a problem arises in that when a resin is used which provides improved abrasion resistance, water resistance and marker resistance for the ink, maintaining the stability of the dispersion is problematic. Moreover, when the colorant is added in an amount sufficient to obtain satisfactory color development in the printed image, a problem arises in that the viscosity of the polymer particle dispersion increases, making preparation of the dispersion difficult.

Further, the method of Patent Document 3 requires a polymerization reaction of the polyfunctional monomer or resin within the dispersed phase, meaning more production steps are required in producing the polymer particle dispersion.

On the other hand, when producing printed items using an ink containing colored resin particles, it is desirable that the color tone of the printed items does not change depending on the storage time or storage state of the ink. This type of change in the color tone of the printed items is particularly problematic when the ink is stored in a high-temperature environment in the period from ink production through until actual use.

An object of the present invention is to provide a colored resin particle dispersion and an ink which provide excellent abrasion resistance and prevent change in the color tone. Moreover, another object of the present invention is to provide a colored resin particle dispersion and an inkjet ink which exhibit excellent abrasion resistance, together with excellent water resistance and marker resistance.

SUMMARY OF THE INVENTION

One aspect of the present invention is a colored resin particle dispersion comprising colored resin particles, a basic dispersant, and a non-aqueous solvent, wherein the colored resin particles comprise a colorant, a solid resin and a liquid organic compound having an acidic group, and the oxidation-reduction potential of the colored resin particle dispersion is 300 mV or less.

Another aspect of the present invention is an inkjet ink comprising the above colored resin particle dispersion.

EMBODIMENTS OF THE INVENTION

A colored resin particle dispersion according to one embodiment of the present invention (hereafter sometimes referred to as simply "the dispersion") comprises colored resin particles, a basic dispersant, and a non-aqueous solvent, wherein the colored resin particles comprise a colorant, a solid resin and a liquid organic compound having an acidic group (hereafter sometimes referred to as simply "the acidic compound"), and the oxidation-reduction potential of the colored resin particle dispersion is 300 mV or less.

As a result, a colored resin particle dispersion and an ink can be provided which provide excellent abrasion resistance and prevent change in the color tone.

By ensuring that the oxidation-reduction potential (ORP) of the colored resin particle dispersion according to the present embodiment is 300 mV or less, change in the color tone of the printed items can be prevented.

Change in the color tone of the printed items is a problem that can occur when printing using an ink containing a colored resin particle dispersion, wherein even though the ink has been prepared using the same components and the same production method, the storage state or the like of the ink causes a change in the color tone of the printed items. This change in the color tone becomes particularly problematic when the ink is stored under high-temperature conditions of about 70° C. or higher.

For example, following production of an ink, during subsequent transport, the storage temperature of the ink can sometimes change depending on the temperature of the warehouse or container. Further, in the case of inkjet applications, heat is sometimes applied to the ink in the discharge unit or the like.

If the color tone of the printed items changes from ink production through until actual use of the ink, then the color reproducibility range for the printed items changes, and there is a possibility that the desired printed item may be unobtainable.

It is thought that this type of change in the color tone of the printed items occurs due to a degeneration of the colorant in the dispersion, and is particularly problematic in high-temperature environments.

In the present embodiment, by ensuring that the oxidation-reduction potential (ORP) of the colored resin particle dispersion is 300 mV or less, degeneration of the colorant caused by temperature changes can be prevented, enabling change in the color tone of the printed items to be prevented.

In the present embodiment, by incorporating the acidic compound in the colored resin particles, the solid resin and the colorant can be blended uniformly, and the abrasion resistance of the printed items can be enhanced. Moreover, even when a sufficient amount of the colorant is added to obtain good color development in the printed image, by incorporating the acidic compound, the solid resin and the colorant can be blended more uniformly and stably, enabling the abrasion resistance of the printed items to be further enhanced.

In the production process for the colored resin particles, by adding the acidic compound to the solvent together with the solid resin and the colorant, and performing subsequent mixing, the system can be stabilized, and each of the components can be blended more uniformly. Particularly when the colored resin particle dispersion is produced using an oil-in-oil emulsion, by adding the acidic compound to the solvent together with the solid resin and the colorant and using the resulting mixture as the dispersed phase, the emulsion stability can be enhanced, and as a result, each of the components of the colored resin particles can be blended more uniformly.

This type of effect on the color development properties achieved by incorporating the acidic compound can be obtained regardless of the type of solid resin that is used.

Furthermore, by encapsulating the colorant in the solid resin, both the abrasion resistance and the marker resistance of the printed items can be enhanced. When a printed item is marked with a marker, the printed item is scraped by the marker, and in some cases the solvent incorporated within the marker and ink may act upon the printed item. By encapsulating the colorant in the solid resin, the rub fastness and the solvent resistance can both be further enhanced. By incorporating the acidic compound, the colorant and the solid resin are blended more uniformly and stably, and therefore the rub fastness and the solvent resistance can be further enhanced, and the marker resistance can be further improved.

Further, even in those cases where a solid resin having water resistance is used as the solid resin, by including the acidic compound, the colorant and the solid resin can be blended more uniformly and stably. As a result, by using a solid resin having water resistance, a colored resin particle dispersion can be provided which not only yields favorable color development properties and abrasion resistance for the printed items, but also exhibits excellent water resistance.

In the present embodiment, the acidic compound is incorporated in the dispersion to improve the abrasion resistance, the marker resistance and the water resistance, and by ensuring that the oxidation-reduction potential of the overall dispersion is 300 mV or less, change in the color tone of the printed items can also be improved.

The colored resin particle dispersion according to the present embodiment has an oxidation-reduction potential of 300 mV or less.

Here, the oxidation-reduction potential describes the value measured at a measurement temperature of 23° C. using a silver electrode as the working electrode and a silver chloride electrode as the reference electrode, with the measurement conducted by inserting the working electrode and the reference electrode in the colored resin particle dispersion. For example, the oxidation-reduction potential can be measured using a portable pH meter "pH-208" and an ORP electrode "ORP-14" (both manufactured by FUSO Co., Ltd.).

By ensuring that the oxidation-reduction potential of the dispersion is 300 mV or less, change in the color tone of the printed items can be prevented.

Change in the color tone can sometimes occur during storage of the dispersion, and particularly during storage in a high-temperature environment, due to degeneration of the colorant.

It was discovered that this type of degeneration of the colorant becomes particularly apparent when the oxidation-reduction potential exceeds 300 mV.

It is thought that in a dispersion for which the oxidation-reduction potential exceeds 300 mV, the ionic bonds and coordination bonds of the molecules that constitute the colorant are more easily cleaved, resulting in a change in the color development properties of the colorant and a change in the color tone of the printed items. This type of problem can occur with all types of colorants.

Among the various types of colorants, degeneration of the colorant is a problem for acid dyes, salt-forming dyes and dye lake pigments and the like, and among acid dyes, is particularly problematic for metal complex dyes.

Examples of metal complex dyes include 1:1 metal complex dyes in which a single metal atom is bonded by coordination bonding to one molecule of a monoazo dye, and 1:2 metal complex dyes in which a single metal atom is bonded by coordination bonding to two molecules of a monoazo dye.

When the oxidation-reduction potential is too high, change in the color tone of 1:2 metal complex dyes is particularly problematic. It is thought that this is because if the oxidation-reduction potential is too high, then one of the two azo dye molecules bonded to the single metal atom of the 1:2 metal complex dye tends to detach, causing degeneration of the dye.

In contrast, by restricting the oxidation-reduction potential of the dispersion to 300 mV or less, degeneration of the colorant can be prevented, enabling change in the color tone of the printed items to be prevented.

The oxidation-reduction potential is preferably 290 mV or less, more preferably 280 mV or less, and even more preferably 260 mV or less.

On the other hand, the lower limit for the oxidation-reduction potential can be set to −30 mV or higher, depending on each of the components of the colored resin particle dispersion. Because the acidic compound is included in the dispersion, the oxidation-reduction potential of the dispersion tends to be 0 mV or higher.

Furthermore, in the production process for the colored resin particle dispersion, because both the acidic compound and the colorant are added to the dispersed phase, the system can be stabilized by using an acidic colorant as the colorant. In light of these circumstances, use of an acidic colorant is preferable. When an acidic colorant is used, the oxidation-reduction potential of the dispersion preferably has low reducing power, whereas the oxidizing power may be somewhat larger. Accordingly, the lower limit for the oxidation-reduction potential is 0 mV or greater.

The oxidation-reduction potential can be adjusted by altering the variety and amounts of the basic dispersant, the acidic compound and any additives. In terms of materials that can be used for adjusting the oxidation-reduction potential, a basic substance which is added to the continuous phase in the method of preparing the dispersion described below is preferable, and among such basic substances, basic dispersants and bases can be used particularly favorably. Specifically, amine compounds are preferred.

(Colored Resin Particles)

The colored resin particles in the present embodiment comprise a colorant, a solid resin, and an acidic compound.

These colored resin particles preferably have a particle shape in which the colorant, the solid resin and the acidic compound are mixed uniformly.

Solid Resin

The solid resin is preferably a resin that is solid at room temperature (23° C.).

In order to ensure stability of the particle shape, the glass transition temperature (Tg) of the solid resin is preferably at least 30° C., and more preferably 40° C. or higher. The glass transition temperature of the solid resin is not particularly limited, but is preferably not higher than 150° C., and is more preferably 120° C. or lower.

Further, in order to ensure stability of the particle shape, the melting temperature (Tm) of the solid resin is preferably at least 30° C., and more preferably 40° C. or higher. The melting temperature of the solid resin is not particularly limited, but is preferably not higher than 250° C., and is more preferably 200° C. or lower.

The weight-average molecular weight of the solid resin is preferably from 3,000 to 100,000, and more preferably from 5,000 to 80,000. Within this range, the stability of the shape of the colored resin particles can be enhanced. Further, in the production process for the colored resin particles, the raw materials including the solid resin can be mixed more uniformly with the solvent, and as a result, colored resin particles in which the components are more uniformly dispersed can be provided.

The weight-average molecular weight of the resin can be determined by the GPC method, and is calculated relative to standard polystyrenes. This also applies below.

The solid resin preferably has a Hansen solubility parameter (HSP value) of 22 to 27 MPa/cm$^3$. Further, the solid resin preferably has a dispersion parameter Sd of 13 to 20, a polar parameter $\delta$p of 5 to 12, and a hydrogen bonding parameter $\delta$h of 10 to 20. By ensuring these ranges are satisfied, the colored resin particles and the non-aqueous solvent can be separated rapidly when an ink composed of the colored resin particle dispersion is applied to a paper, thus enabling a greater improvement in the abrasion resistance.

The method used for calculating the solubility parameter is described below. In the present invention, the three-dimensional solubility parameter proposed by Hansen in 1967 is used.

The Hansen solubility parameter divides the solubility parameter introduced by Hildebrand into 3 components, namely the dispersion parameter $\delta$d, the polar parameter $\delta$p, and the hydrogen bonding parameter $\delta$h, and is represented within a three-dimensional space. The dispersion parameter indicates the effects due to dispersive forces, the polar parameter indicates the effects due to dipolar intermolecular forces, and the hydrogen bonding parameter indicates the effects due to hydrogen bonding forces. A more detailed description is provided in "Polymer Handbook. Fourth Edition (Editors: J. Brandrup, E. H. Immergut, and E. A. Grulke)" or the like.

As described below, the Hansen solubility parameter can be determined experimentally.

First, the solubility (10 mass %) of a target substance (such as a solid resin) in the solvents shown in Table 1, for which the dispersion parameter $\delta$d, the polar parameter $\delta$p and the hydrogen bonding parameter $\delta$h are already known, is investigated. Subsequently, the ranges (minimum values and maximum values) for the dispersion parameter $\delta$d, the polar parameter $\delta$p and the hydrogen bonding parameter $\delta$h that correspond with those solvents which dissolve the target substance are determined, and the values in the middle of those ranges (the central values of the three-dimensional solubility parameter ranges) are used as the three-dimensional solubility parameters for the target substance. In other words, the largest rectangular prism for which good solvents fall inside the prism and poor solvents fall outside the prism is determined, and the center of that rectangular prism is defined as the solubility parameter (HSP value) for the target substance.

dispersion parameter $\delta d = (\delta d_{max} - \delta d_{min})/2$ polar parameter $\delta p = (\delta p_{max} - \delta p_{min})/2$ hydrogen bonding parameter $\delta h = (\delta h_{max} - \delta h_{min})/2$ $HSP^2 = \delta d^2 + \delta p^2 + \delta h^2$ The solvents selected for the solubility tests preferably have solubility parameters (HSP values) positioned in very different three-dimensional spaces. Table 1 shows the solubility parameter (HSP value), the dispersion parameter δd, the polar parameter δp and the hydrogen bonding parameter δh for various solvents.

TABLE 1

List of solvents used in solubility tests

| Solvent | HSP (MPa/cm³) | δd | δp | δh |
|---|---|---|---|---|
| n-heptane | 15.3 | 15.3 | 0.0 | 0.0 |
| tetrachloroethylene | 18.7 | 18.0 | 5.0 | 0.0 |
| cyclohexane | 16.8 | 16.8 | 0.0 | 0.2 |
| toluene | 18.2 | 18.0 | 1.4 | 2.0 |
| tetrahydronaphthalene | 19.8 | 19.6 | 0.0 | 2.9 |
| α-bromonaphthalene | 20.9 | 20.3 | 3.1 | 4.1 |
| diisobutyl ketone | 16.9 | 16.0 | 3.7 | 4.1 |
| propylene carbonate | 27.3 | 20.1 | 18.0 | 4.1 |
| methyl isobutyl ketone | 17.0 | 15.3 | 6.1 | 4.1 |
| methyl ethyl ketone | 19.1 | 16.0 | 9.0 | 5.1 |
| chloroform | 18.9 | 17.8 | 3.1 | 5.7 |
| acetonitrile | 24.4 | 15.3 | 18.0 | 6.1 |
| dichloromethane | 20.2 | 18.2 | 6.3 | 6.1 |
| butyl acetate | 17.4 | 15.8 | 3.7 | 6.3 |
| acetone | 19.9 | 15.5 | 10.4 | 7.0 |
| ethyl acetate | 18.2 | 15.8 | 5.3 | 7.2 |
| N-methylpyrrolidone | 23.0 | 18.0 | 12.3 | 7.2 |
| 1,4-dioxane | 20.5 | 19.0 | 1.8 | 7.4 |
| γ-butyrolactone | 26.3 | 19.0 | 16.6 | 7.4 |
| tetrahydrofuran | 19.5 | 16.8 | 5.7 | 8.0 |
| propylene glycol monomethyl ether acetate | 19.3 | 15.6 | 5.6 | 9.8 |
| dimethyl sulfoxide | 26.7 | 18.4 | 16.4 | 10.2 |
| butyl carbitol | 20.4 | 16.0 | 7.0 | 10.6 |
| diacetone alcohol | 20.8 | 15.8 | 8.2 | 10.8 |
| dimethylformamide | 24.9 | 17.4 | 13.7 | 11.3 |
| propylene glycol monomethyl ether | 20.4 | 15.6 | 6.3 | 11.6 |
| 2-ethylhexanol | 20.2 | 16.0 | 3.3 | 11.9 |
| 2-ethylbutanol | 21.2 | 15.8 | 4.3 | 13.5 |
| cyclohexanol | 22.4 | 17.4 | 4.1 | 13.5 |
| n-pentanol | 21.7 | 16.0 | 4.5 | 13.9 |
| 2-phenoxyethanol | 23.5 | 17.8 | 5.7 | 14.3 |
| 1-butanol | 23.2 | 16.0 | 5.7 | 15.8 |
| methyl cellosolve | 24.8 | 16.2 | 9.2 | 16.4 |
| isopropyl alcohol | 23.6 | 15.8 | 6.1 | 16.4 |
| n-propanol | 24.6 | 16.0 | 6.8 | 17.4 |
| dipropylene glycol | 26.4 | 16.5 | 10.6 | 17.7 |
| ethanol 99.9% | 26.5 | 15.8 | 8.8 | 19.4 |
| diethylene glycol | 29.1 | 16.6 | 12.0 | 20.7 |
| methanol | 29.6 | 15.1 | 12.3 | 22.3 |
| water | 47.9 | 15.5 | 16.0 | 42.4 |

Any solid resin having the properties described above can be used favorably, and there are no particular limitations on the type of resin used.

Specific examples of the solid resin include alkylphenol resins, polyvinyl alcohols (PVA), (meth)acrylic-based resins, styrene-(meth)acrylic-based resins, styrene-maleic acid resins, cellulose-based resins, polyvinyl acetal resins, polyamide resin such as methoxymethylated nylon, ketone resins, rosin resins, vinyl acetate resins, polyvinylpyrrolidones, phosphorylated solid resins, nitrated solid resins, alkoxy group-containing solid resins, polysilsesquioxanes, methoxysilsesquioxanes, ethoxysilsesquioxanes, and derivatives of these resins.

The above resins may be used individually, or a combination of two or more resins may be used.

The term "(meth)acrylic-based resins" means methacrylic resins and/or acrylic resins, and includes polymers containing only methacrylic units or acrylic units, as well as copolymers containing both methacrylic units and acrylic units. The styrene-(meth)acrylic-based resins are similarly defined.

Polyvinyl alcohols are generally produced using a polyvinyl acetate as a raw material, by substituting the acetate groups of the polyvinyl acetate with hydroxyl groups, and are therefore resins which contain acetate groups as well as hydroxyl groups depending on the degree of substitution.

If the molar ratio of units having a hydroxyl group relative to the combined total of all the units that constitute the polyvinyl alcohol is termed n, and the molar ratio of units having an acetate group (—O—CO—CH$_3$) is termed m, then the degree of saponification is represented by (n/(n+m))×100, and the polymerization degree is represented by n+m.

The degree of saponification ((n/(n+m))×100) for the polyvinyl alcohol is preferably from 0 to 60 mol %, and more preferably from 1 to 50 mol %.

The polymerization degree (n+m) of the polyvinyl alcohol is preferably from 10 to 1,000, and more preferably from 20 to 500.

For the polyvinyl acetal resin, a resin produced by acetalization of a polyvinyl alcohol (PVA) resin can be used. Specifically, by reacting a PVA resin with an aldehyde in the presence of an acid catalyst, some or all of the hydroxyl groups of the PVA resin are acetalized, enabling the production of a polyvinyl acetal resin.

The degree of saponification (n/(n+m)×100) of the polyvinyl alcohol required when preparing the polyvinyl acetal resin is preferably at least 2, and more preferably 5 or greater.

Further, the polymerization degree (n+m) of the polyvinyl alcohol is preferably from 10 to 1,000, and more preferably from 20 to 500.

Examples of compounds that can be used as the aldehyde include formaldehyde, acetaldehyde, para-formaldehyde, trioxane, tetraoxane, propionaldehyde and butyraldehyde.

Furthermore, alicyclic aldehydes and aromatic aldehydes may also be used as the aldehyde.

Examples of the alicyclic aldehydes include cyclohexane carboxaldehyde, 5-norbornene-2-carboxaldehyde, 3-cyclohexene-1-carboxaldehyde, and dimethyl-3-cyclohexene-1-carboxaldehyde.

Examples of the aromatic aldehydes include 2,4,6-trimethylbenzaldehyde (mesitaldehyde), 2,4,6-triethylbenzaldehyde, 2,6-dimethylbenzaldehyde, 2-methylbenzaldehyde, 2-methoxy-1-naphthaldehyde, 2-ethoxy-1-naphthaldehyde, 2-propoxy-1-naphthaldehyde, 2-methyl-1-naphthaldehyde, 2-hydroxy-1-naphthaldehyde, 1-naphthaldehydes having other substituents, 2-naphthaldehydes having a substituent, 9-anthraldehyde, and 9-anthraldehydes having a substituent.

A ketone may be used in addition to, or instead of, the aforementioned aldehyde.

Examples of the ketone include acetophenones such as 2-methylacetophenone and 2,4-dimethylacetophenone, and naphthones such as 2-hydroxy-1-acetonaphthone, 8'-hydroxy-1'-benzonaphthone and acetonaphthone.

These aldehydes and ketones may be used individually, or combinations may be used.

The polyvinyl acetal resin preferably has a degree of acetalization of 40 to 95 mol %, and more preferably 50 to 85 mol %. This ensures that when the solid resin is mixed with the colorant and the solvent and the like during the production process for the colored resin particles, the solubility of the solid resin in the solvent can be improved. As a result, the uniformity of the components within the colored resin particles and the stability of the shape of the particles can be enhanced.

The degree of acetalization of the polyvinyl acetal resin can be represented by the proportion of hydroxyl groups within the polyvinyl alcohol resin that have been acetalized. In the case of a polyvinyl butyral resin, the degree of acetalization can be measured in accordance with JIS K6728.

When the polyvinyl alcohol resin is acetalized with butyraldehyde, this degree of acetalization can be termed the degree of butyralization. This degree of butyralization preferably satisfies the same range as that mentioned above for the degree of acetalization.

In the polyvinyl acetal resin, the proportion of hydroxyl groups is preferably not more than 60 mol %, and more preferably 50 mol % or less. This ensures that when the solid resin is mixed with the colorant and the solvent and the like during the production process for the colored resin particles, the solubility of the solid resin in the solvent can be improved. As a result, the uniformity of the components within the colored resin particles and the stability of the shape of the particles can be enhanced.

Here, the proportion of hydroxyl groups in the solid resin can be represented by the ratio of the units having a hydroxyl group (mol) relative to the total of all the units (mol) that constitute the solid resin. This definition also applies below.

For the polyvinyl acetal resin, a polyvinyl butyral resin (hereafter sometimes referred to as simply a "butyral resin") obtained by acetalizing a polyvinyl alcohol resin with butyraldehyde, or a polyvinyl formal resin (vinylon) obtained by acetalizing a polyvinyl alcohol resin with formaldehyde can be used favorably.

Examples of commercially available polyvinyl butyral resins that can be used include "BL-2H", "BL-10", "BL-S", "BM-1", "BM-2", "MN-6", and "BX-L" and the like from the S-LEC B series manufactured by Sekisui Chemical Co., Ltd., and "16H", "20H", "30T", "30H", "30HH", "45M", and "45H" and the like from the Mowital B series manufactured by Kuraray Co., Ltd.

Examples of commercially available polyvinyl formal resins that can be used include "Vinylec K" and "Vinylec C" and the like from the Vinylec series manufactured by JNC Corporation, and Vinylon fiber and the like manufactured by Kuraray Co., Ltd.

These products may be used individually, or combinations of two or more products may be used.

The alkylphenol resin may be either a novolac-type alkylphenol resin or a resol-type alkylphenol resin, or a combination of these types may be used.

A novolac-type alkylphenol resin can be produced by reacting an alkylphenol and an aldehyde in the presence of an acid catalyst.

A resol-type alkylphenol resin can be produced by reacting an alkylphenol and an aldehyde in the presence of an alkali catalyst.

Further, a modified alkylphenol resin may also be used. Examples of modified alkylphenol resins include rosin-modified alkylphenol resins, and alkoxy group-containing silane-modified alkylphenol resins.

The raw material alkylphenol preferably has an alkyl group with a carbon number of 1 to 12. Specific examples of compounds that can be used as the alkylphenol include o-cresol, m-cresol, p-cresol, xylenol, ethylphenol, propylphenol, butylphenol, amylphenol, octylphenol, nonylphenol, dodecylphenol, bisphenol A, bisphenol B, bisphenol C, bisphenol E and bisphenol F. These compounds may be used individually, or a combination of two or more compounds may be used. There are no limitations on the position of the substituent(s) in these alkylphenols.

Examples of compounds that can be used as the aldehyde include formaldehyde, acetaldehyde, butyraldehyde, paraformaldehyde, trioxane and tetraoxane, or combinations of these compounds.

Examples of the cellulose-based resins include cellulose acetate resins, cellulose acetate butyrate resins, cellulose acetate propionate resins, and nitrocellulose.

The blend amount of the solid resin described above, relative to the total mass of the colored resin particles, is preferably at least 10 mass %, and more preferably 20 mass % or greater.

On the other hand, the blend amount of the solid resin relative to the total mass of the colored resin particles is preferably not more than 70 mass %, and more preferably 50 mass % or less.

The colored resin particles may also contain one or more other resins besides the resin described above, provided that the effects of the present invention are not impaired. As described below in the method of producing the colored resin particle dispersion, examples of these other resins include pigment dispersants and additives and the like.

Colorant

The colorant incorporated in the colored resin particles may be either a pigment or a dye, or a combination of the two.

Any of the dyes typically used in this technical field can be used as the dye, and examples include acid dyes, basic dyes, direct dyes, soluble vat dyes, acid mordant dyes, mordant dyes, reactive dyes, vat dyes, sulfide dyes, metal complex dyes and salt-forming dyes. These dyes may be used individually, or a plurality of dyes may be combined.

Provided the dye can be dissolved or dispersed in the dispersion, either an oil-soluble dye or a water-soluble dye may be used as the dye.

Specific examples of oil-soluble dyes include azo dyes, metal complex dyes, naphthol dyes, anthraquinone dyes, indigo dyes, carbonium dyes, quinoneimine dyes, xanthene dyes, cyanine dyes, quinoline dyes, nitro dyes, nitroso dyes, benzoquinone dyes, naphthoquinone dyes, phthalocyanine-based dyes and metal phthalocyanine-based dyes.

Examples of water-soluble dyes include those dyes among the various dyes mentioned above that are either soluble in water or can be made soluble in water by reduction or the like.

Specific examples of such water-soluble dyes include azo dyes, rhodamine dyes, sulforhodamine dyes, methine dyes, azomethine dyes, xanthene dyes, quinone dyes, phthalocyanine-based dyes, triphenylmethane dyes, diphenylmethane dyes, and methylene blue and the like.

A salt-forming dye can be used particularly favorably as the dye. Examples of salt-forming dyes that can be used include salt-forming dyes produced by reacting an acid dye and a basic dye, salt-forming dyes prepared by generating a salt of an acid dye with a base such as an organic amine, and salt-forming dyes prepared by generating a salt of a basic dye with an acid such as an organic acid.

The dye is preferably an oil-soluble dye which exhibits solubility in the solvent and resin of the dispersed phase. Further, using an acid dye means that when the dispersion is prepared using an oil-in-oil emulsion, the basic dispersant is incorporated in the continuous phase and the acidic acid dye is incorporated in the dispersed phase, and therefore the oil-in-oil dispersion can be better stabilized.

A metal complex dye, metal phthalocyanine-based dye, acid azo dye, or acid anthraquinone dye or the like can be used particularly favorably as the oil-soluble acid dye.

Among the various possibilities, change in the color tone can be particularly well prevented when a 1:1 metal complex dye and/or a 1:2 metal complex dye is used as the metal complex dye. Particularly in the case of a 1:2 metal complex dye, detachment of one of the two molecules of the azo dye bonded to the single metal atom can be prevented, meaning degeneration of the dye can be prevented.

Specific examples of metal complex dyes that can be used include the "VALIFAST Color series" manufactured by Orient Chemical Industries Co., Ltd., including Valifast Black 3804, 3810 (solvent black 29), 3820, 3830, 3840 (solvent black 27) and 3870, Valifast Blue 1605, 2606, 2620 and 2670, Valifast Orange 3209 and 3210, Valifast Pink 2310N and 2312, Valifast Red 3304, 3311, 3312 and 3320, and Valifast Yellow 3108, 3170, 4120 and 4121;

the "Orasol series" manufactured by BASF Corporation, including Orasol Black RL1, Blue GN, Pink 5BLG and Yellow 2RLN; and the "Aizen Spilon series" manufactured by Hodogaya Chemical Co., Ltd., including Aizen Spilon Black BH and RLH, Aizen Spilon Violet RH, Aizen Spilon Red CBH and BEH, Aizen Spilon Yellow GRH, Aizen SPT Blue 26, Aizen SPT Blue 121, and Aizen SBN Yellow 510, Among the above dyes, examples of 1:2 metal complex dyes that can be used favorably include Valifast Black 3804, 3810, 3820, 3830 and 3840.

Examples of metal phthalocyanine-based dyes that can be used include Valifast Blue 1605, 2606, 2620 and 2670 from the "VALIFAST Color series" manufactured by Orient Chemical Industries Co., Ltd.

Examples of other oil-soluble dyes that can be used include OIL Blue 613, OIL Yellow 107, and Spilit Black AB and ROB-B from the "OIL Color series" manufactured by Orient Chemical Industries Co., Ltd.

Examples of water-soluble dyes that can be used include the "WATER Color series" manufactured by Orient Chemical Industries Co., Ltd., including Water Blue 9, Water Red 1, 2 and 27 (Acid Red 52), Water Pink 2 and Water Yellow 6C; and dyes manufactured by Daiwa Kasei Co., Ltd., including Direct Blue 199, Daiwa IJ Blue 109H, Reactive Blue 49, Acid Red 289, Daiwa IJ Red 311H, Reactive Red 218, and Daiwa IJ Yellow 214H.

Examples of salt-forming dyes that can be used include dyes from the "VALIFAST Color series" manufactured by Orient Chemical Industries Co., Ltd., including Valifast Black 1815 and 1821, Valifast Blue 1613, 1621 and 1631, Valifast Red 1308 (a mixture of Basic Red 1 and Acid Yellow 23), 1355, 1362, 1364 and 1388, Valifast Yellow 1101 and 1151, and Valifast Violet 1731.

Organic pigments such as azo pigments, phthalocyanine pigments, polycyclic pigments and dye lake pigments, and inorganic pigments such as carbon blacks and metal oxides can be used as the pigment. Examples of the azo pigments include soluble azo lake pigments, insoluble azo pigments and condensed azo pigments. Examples of the phthalocyanine pigments include metal phthalocyanine pigments and metal-free phthalocyanine pigments. Examples of the polycyclic pigments include quinacridone-based pigments, perylene-based pigments, perinone-based pigments, isoindoline-based pigments, isoindolinone-based pigments, dioxazine-based pigments, thioindigo-based pigments, anthraquinone-based pigments, quinophthalone-based pigments, metal complex pigments and diketopyrrolopyrrole (DPP). Examples of the carbon blacks include furnace carbon black, lamp black, acetylene black and channel black. Examples of the metal oxides include titanium oxide and zinc oxide.

These pigments may be used individually, or a combination of two or more pigments may be used.

The average particle size of the pigment is preferably 300 nm or less, and more preferably 200 nm or less. This ensures that the dispersibility of the pigment within the dispersed phase can be maintained favorably, and also ensures that the particle size of the final colored resin particles is appropriate.

In the present embodiment, if a dye lake pigment is used as the colorant, then change in the color tone can be more effectively prevented.

Dye lake pigments are pigments prepared by insolubilizing a basic dye using an acid, and specific examples include Alizarin Lake, Rhodamine Lake, Quinoline Yellow Lake, Methyl Violet Lake and Malachite Green Lake.

Examples of products that can be used as the dye lake pigment include Seikalight Magenta 2R (Rhodamine Lake B (C.I. 45170:2)) manufactured by Dainichiseika Color & Chemicals Mfg. Co., Ltd., and Fanal Violet 6060, Fanal Violet D 5480, Fanal Pink D 4810, Fanal Pink D 4830, and Fanal Blue D 6390, all manufactured by BASF Japan Ltd.

When a pigment is used for the colorant, solid chips having the pigment already dispersed in the aforementioned solid resin can be used. In such a case, the affinity between the pigment and the resin is improved, and the fixability can be further enhanced. Further, such solid chips are also advantageous from the viewpoint of ink production. Examples of methods that can be used for dispersing the pigment in the solid resin include a method using a twin roll mill or the like.

From the viewpoints of the coloring properties and the uniformity of the components, the amount added of the colorant, reported as the combined amount of the pigments and dyes relative to the total mass of the colored resin particles, is preferably from 0.1 to 50 mass %, more preferably from 1 to 40 mass %.

Acidic Compound

The colored resin particles also comprise a liquid organic compound having an acidic group (the acidic compound). Here, a liquid organic compound having an acidic group refers to an organic compound which is liquid at 23° C. and contains an acidic group.

By adding the acidic compound, the color development properties and the abrasion resistance of the printed items can be further improved. This is because the acidic compound enables the colorant and the solid resin to be blended more uniformly and stably.

Further, when a resin having a low acid value and superior water resistance is used as the solid resin, the abrasion resistance can sometimes deteriorate, but by adding an acidic compound together with this type of solid resin, the water resistance and the abrasion resistance can be improved. Examples of resins having a low acid value and superior water resistance include alkylphenol resins, polyvinyl alcohols (PVA), styrene-maleic acid resins, cellulose-based resins, polyvinyl acetal resins, polyamide resins such as methoxymethylated nylon, ketone resins, rosin resins, and vinyl acetate resins.

Further, the acidic compound can also be added during the production process for the colored resin particle dispersion for the purpose of maintaining the stability of the oil-in-oil emulsion.

In order to ensure that the acidic compound maintains a liquid state at room temperature, the melting point of the acidic compound is preferably 23° C. or lower, and more preferably 15° C. or lower.

When the acidic compound is dissolved in a non-aqueous solvent, it is preferable that as the concentration of the acidic compound increases, the oxidation-reduction potential (ORP) value increases.

For example, when the acidic compound is dissolved in a solvent capable of dissolving the acidic compound, it is preferable that the ORP value when the acidic compound is dissolved in an amount of 5.0 mass % is higher than the ORP value when the acidic compound is dissolved in an amount of 0.5 mass %.

Further, the ORP value when the acidic compound is dissolved in methanol in an amount of 5.0 mass % is preferably at least 200 mV, and more preferably 300 mV or higher.

On the other hand, if the acidic compound includes a basic group as well as the acidic group, then the compound can still be used favorably as the acidic compound, despite containing a basic group, provided the ORP value exhibits this tendency to increase. It is preferable that the acidic compound does not contain a basic group.

Here, the oxidation-reduction potential (ORP value) describes the value measured at a measurement temperature of 23° C. using a silver electrode as the working electrode and a silver chloride electrode as the reference electrode, with the measurement conducted by inserting the working electrode and the reference electrode in a solution of any of various materials. For example, the oxidation-reduction potential can be measured using a portable pH meter "pH-208" and an ORP electrode "ORP-14" (both manufactured by FUSO Co., Ltd.). This also applies below.

The solubility parameter of the acidic compound is preferably a Hansen solubility parameter (HSP value) of 22 to 27 MPa/cm$^3$. Further, the acidic compound preferably has a dispersion parameter $\delta d$ of 13 to 20, a polar parameter $\delta p$ of 5 to 12, and a hydrogen bonding parameter $\delta h$ of 10 to 20. By ensuring these ranges are satisfied, the components of the colored resin particles can be blended more uniformly, the particle shape can be stabilized and the stability over time can be improved, and the color development and the abrasion resistance can be further improved.

Examples of the acidic group of the acidic compound include a phosphoric acid group, carboxyl group, sulfonic acid group, phosphate ester group, sulfate ester group, nitrate ester group, phosphorous acid group, phosphonic acid group and sulfinic acid group. Any one of these groups, or a combination of two or more groups, may be included within each molecule. The acidic compound preferably has two or more acidic groups within each molecule.

The acidic compound may be an oligomer, a polymer or a low molecular weight compound.

Examples of the oligomer or polymer include poly(meth)acrylic-based resins, polyester-based resins, polyvinyl-based resins and polyether-based resins and the like, which may be used individually or in combinations. Further, copolymers of the monomers or oligomers that constitute these resins may also be used.

The acidic group may be derived from the monomer that constitutes the oligomer or polymer, thereby introducing an acidic group bonded to the main chain or side chain of each structural unit. Examples include copolymers or the like of a (meth)acrylate ester and (meth)acrylic acid. In such cases, carboxyl groups are introduced in accordance with the proportion of (meth)acrylic acid used. Further examples include copolymers of a (meth)acrylate ester and an acid-phosphoxy-(meth)acrylate. In such cases, phosphoric acid groups are introduced.

Further, the acidic groups may be introduced by phosphorylation of an oligomer or polymer. In such cases, phosphoric acid groups are introduced in accordance with the positions and proportion of hydroxyl groups. When the oligomer or polymer has hydroxyl groups at both terminals, phosphoric acid groups are introduced at both terminals of the oligomer or polymer, meaning the acidic compound has a total of two phosphoric acid groups.

When the acidic compound is an oligomer or a polymer, the weight-average molecular weight is preferably from 500 to 10,000, and more preferably from 1,000 to 5,000.

Specific examples of the oligomer or polymer for the acidic compound include phosphate ester compounds, including polyoxyalkyl phosphate esters such as polyoxyethylene alkyl phosphate esters and polyoxyethylene polyoxypropylene phosphate esters, and polyether polyester phosphate esters; alkyl polyphosphonic acids; and carboxyl group-containing (meth)acrylic polymers. These compounds may be used individually, or a plurality of compounds may be combined.

Low molecular weight compounds such as phosphate esters, sulfate esters, and 1-hydroxyethane-1,1-diphosphonic acid and the like may also be used as the acidic compound.

The acidic compound preferably has an acid value. The acid value of the acidic compound is preferably at least 30 mgKOH/g, more preferably 60 mgKOH/g or higher, and even more preferably 90 mgKOH/g or higher.

Here, the acid value describes the number of milligrams of potassium hydroxide needed to neutralize all of the acidic components within 1 g of the non-volatile fraction of the compound. This definition also applies below.

Among the various possibilities, liquid organic compounds having at least one of a phosphoric acid group, a phosphonic acid group, a phosphate ester group and a carboxyl group, and having an acid value of at least 30 mgKOH/g are preferable, and compounds having one or more phosphoric acid groups are particularly preferred. Further, acidic compounds having a phosphoric acid group at both terminals of the compound are particularly desirable.

Examples of commercially available products that can be used as the acidic compound include "DISPERBYK-102, 110, 111" (all product names) manufactured by BYK-Chemie Japan K.K., "TEGO Dispers 655" manufactured by Tomoe Engineering Co., Ltd., "Efka 6230" manufactured by Efka Chemicals B.V., "PH-210" manufactured by Chelest Corporation, "ARUFON UC3510" manufactured by Toagosei Co., Ltd., and "CM294P" manufactured by Unichemical Co., Ltd.

"DISPERBYK-111" is a phosphate ester compound of a block copolymer of ethylene glycol and polycaprolactone, and has phosphoric acid groups at both terminals of the copolymer.

"CM294P" is a phosphate ester compound of a block copolymer of ethylene oxide and propylene oxide, and has phosphoric acid groups at both terminals of the copolymer.

"ARUFON UC3510" is a copolymer of an acrylate ester and acrylic acid, and contains a plurality of carboxyl groups.

"Chelest PH-210" is 1-hydroxyethane-1,1-diphosphonic acid, and is a low molecular weight compound having two phosphonic acid groups.

The acidic compound is preferably blended in an amount of 0.1 to 50 mass %, and more preferably 1 to 40 mass %, relative to the total mass of the colored resin particles. This enables the uniformity and stability of the colored resin particle components to be maintained, while avoiding any effects on other raw materials.

Plasticizer

In addition to the acidic compound described above, the colored resin particles may also include a liquid organic compound having no acidic groups (hereafter sometimes referred to as simply a "plasticizer"). This enables the abrasion resistance of the printed items to be further enhanced.

The plasticizer lowers the softening region of the solid resin and imparts plasticity, and therefore by adding the plasticizer when the solid resin and the colorant of the colored resin particles are mixed, the solid resin and the colorant can be mixed together more uniformly. As a result, the components of the colored resin particles are blended more uniformly, and the abrasion resistance can be further enhanced.

The solubility of the plasticizer in the non-aqueous solvent at 23° C. is preferably not more than 3 g/100 g, which enables the solid resin of the colored resin particles to be imparted with plasticity, while preventing dissolution in the non-aqueous solvent, and enabling the shape stability of the colored resin particles to be maintained. Further, when the colored resin particle dispersion is produced, coalescence of the dispersed phase containing the solid resin and the colorant can be prevented, enabling the stability of the oil-in-oil emulsion to be further enhanced. As a result, the components of the colored resin particles can be dispersed more uniformly.

This solubility at 23° C. is more preferably 1 g/100 g or less, and even more preferably 0.5 g/100 g or less. It is further more preferable that, in the blend proportions used in the colored resin particle dispersion, the plasticizer is essentially insoluble in the non-aqueous solvent.

The melting point of the plasticizer is preferably 23° C. or lower, and more preferably 15° C. or lower. This enables the solid resin and the colorant of the colored resin particles to be mixed together more uniformly.

The plasticizer may be a low molecular weight compound, a polymer compound, or a combination thereof.

Examples of compounds that can be used as the low molecular weight compound include alcohols, esters, and ethers and the like.

For the alcohols, lower polyhydric alcohols and/or higher polyhydric alcohols can be used favorably. The number of hydroxyl groups in these alcohols is preferably from 1 to 10.

The carbon number of the lower polyhydric alcohols is preferably from 4 to 6.

Specific examples of the lower polyhydric alcohols include diols such as 1,5-pentanediol, 1,6-hexanediol and 3-methyl-1,5-pentanediol.

The carbon number of the higher polyhydric alcohols is preferably from 10 to 250.

Specific examples of the higher polyhydric alcohols include polyols such as castor oil polyols.

For the esters, low molecular weight esters can be used favorably.

The carbon number of these low molecular weight esters is preferably from 8 to 30.

Specific examples of the low molecular weight esters include diisononyl phthalate, di-2-ethylhexyl adipate and diisononyl adipate.

High molecular weight compounds such as polyesters, polyethers and (meth)acrylic polymers can also be used favorably as the plasticizer.

The weight-average molecular weight of these high molecular weight compounds is preferably from 300 to 8,000, and more preferably from 1,000 to 5,000. This enables a good balance to be achieved between the shape stability and the plasticity of the colored resin particles.

Examples of the polyesters include polyester polyols obtained by subjecting a low molecular weight polyol and a dibasic acid to an esterification reaction, polycaprolactone, and poly-β-methyl-δ-valerolactone and the like.

Specific examples of the polyester polyols include adipic acid-diethylene glycol (AA-DEG), adipic acid-neopentyl glycol (AA-NPG), and adipic acid-trimethylolpropane/diethylene glycol (AA-TMP/DEG).

Examples of the polyethers include polyether polyols such as polyethylene glycol, polyoxypropylene glycol and poly(oxytetramethylene) glycol.

Examples of compounds that can be used as the (meth)acrylic polymer include not only (meth)acrylic resins having methacrylic units and/or acrylic units, but also copolymers having other units besides the methacrylic units and/or acrylic units. For example, vinyl acetate units and styrene units and the like can be used as other monomers.

Examples of commercially available (meth)acrylic polymers include "ARUFON UP-1010", "ARUFON UP-1190", "ARUFON UH-2000", "ARUFON UH-2190" "ARUFON UH-2041", "ARUFON UG-4010" and "ARUFON US-6100", all manufactured by Toagosei Co., Ltd.

These plasticizers may be used individually, or combinations of two or more plasticizers may be used.

Among the various possibilities, the use of polyesters, polyethers or (meth)acrylic polymers, either individually or in combinations, is preferable.

The blend amount of the aforementioned plasticizer is preferably from 5 to 40 mass % relative to the total mass of the colored resin particles.

The average particle size of the colored resin particles is preferably not more than about 10 μm, and is more preferably 5 μm or less, and even more preferably 1 μm or less. The average particle size of the colored resin particles may be adjusted appropriately in accordance with the type of recording medium, and for example in order to improve the color development and fixability for printed items using coated paper, this average particle size is preferably about 100 to 250 nm, and from the viewpoint of inhibiting show-through on printed items using plain paper, the average particle size is preferably 140 to 250 nm.

Here, the average particle size of the colored resin particles refers to the volume-based average particle size determined by a dynamic scattering method, and can be measured, for example, using a dynamic light scattering particle size distribution analyzer "LB-500" manufactured by Horiba, Ltd. This also applies below.

(Colored Resin Particle Dispersion)

The colored resin particle dispersion according to the present embodiment comprises a non-aqueous solvent and a basic dispersant in addition to the colored resin particles described above. The non-aqueous solvent and the basic dispersant are as described below in relation to the method of producing the colored resin particle dispersion.

The non-aqueous solvent is preferably a solvent capable of dispersing the colored resin particles.

The basic dispersant is added for the purpose of dispersing the colored resin particles in the non-aqueous solvent. Further, the basic dispersant can also be added for the purpose of adjusting the oxidation-reduction potential of the dispersion. Furthermore, the basic dispersant is sometimes added to adjust the emulsion in the production process for the colored resin particles described below.

From the viewpoint of dispersibility, the basic dispersant is preferably added in an amount of 0.1 to 20 mass %, and more preferably 1 to 15 mass %, relative to the total mass of the dispersion.

In the colored resin particle dispersion according to the present embodiment, the amount of the colored resin particles relative to the total mass of the dispersion is preferably at least 1 mass %, more preferably 5 mass % or greater, and even more preferably 8 mass % or greater. This enables the dispersion to exhibit superior coloring properties as an ink, and also reduces the amount of solvent, thus enhancing the drying properties.

On the other hand, the amount of the colored resin particles relative to the total mass of the dispersion is preferably not more than 50 mass %, and is more preferably 40 mass % or less, and even more preferably 30 mass % or less. This enables the dispersibility and storage stability to be enhanced.

(Method of Producing Colored Resin Particle Dispersion)

Examples of the method of producing the colored resin particle dispersion of the present embodiment are described below. However, the colored resin particle dispersion according to the present embodiment is not limited to dispersions produced using the following production methods.

Methods of preparing the colored resin particle dispersion can be broadly classified into chemical methods and physicochemical methods. Examples of the chemical methods include interfacial polycondensation methods, interfacial reaction methods (in situ polymerization methods), and in-liquid cured coating methods (orifice methods). Examples of the physicochemical methods include in-liquid drying methods (in-water drying methods and in-oil drying methods), coacervation methods, and fusion dispersion cooling methods.

The colored resin particle dispersion according to the present embodiment can be prepared, for example, using one of the physicochemical methods mentioned above. In-liquid drying methods can be used favorably, and an in-oil drying method of an oil-in-oil emulsion can be used particularly favorably.

By using an in-oil drying method of an oil-in-oil emulsion, the materials described above can be used to prepare colored resin particles having a small average particle size and a narrow particle size distribution, and a colored resin particle dispersion having a low viscosity can be prepared. As a result, an ink that is particularly suited to inkjet discharge can be obtained, and an inkjet ink having excellent rub fastness can be obtained.

A colored resin particle dispersion produced using an in-oil drying method of an oil-in-oil emulsion can be obtained using a phase containing at least the basic dispersant and a non-aqueous solvent (hereafter the non-aqueous solvent of the continuous phase is sometimes referred to as "solvent A") as the continuous phase, and a phase containing at least the colorant, the solid resin, the acidic compound and a non-aqueous solvent (hereafter the non-aqueous solvent of the dispersed phase is sometimes referred to as "solvent B") as the dispersed phase, by mixing the continuous phase and the dispersed phase to prepare an oil-in-oil (O/O) emulsion, and then removing the solvent B of the dispersed phase from the emulsion.

In order to ensure stable preparation of the oil-in-oil emulsion, the solvent B preferably exhibits low solubility in the solvent A. Further, in order to enable removal of the solvent B, the solvent B preferably has a lower boiling point than that of the solvent A.

In order to ensure stable preparation of the oil-in-oil emulsion, the basic dispersant preferably has a higher solubility in the solvent A than in the solvent B. Further, in order to stabilize the shape of the colored resin particles, the resin preferably has a higher solubility in the solvent B than in the solvent A.

Continuous Phase

The continuous phase contains the solvent A and the basic dispersant.

The solvent A may be selected appropriately from all manner of non-aqueous solvents, so as to satisfy the relationships described below with the acidic dispersant, the solvent B and the solid resin.

Both non-polar organic solvents and polar organic solvents can be used as the non-aqueous solvent. These solvents may be used individually, or combinations of two or more solvents may be used, provided they form a single phase.

Examples of preferred non-polar organic solvents include petroleum-based hydrocarbon solvents such as aliphatic hydrocarbon solvents, alicyclic hydrocarbon solvents and aromatic hydrocarbon solvents. Examples of the aliphatic hydrocarbon solvents and alicyclic hydrocarbon solvents include paraffin-based, isoparaffin-based, and naphthene-based solvents. Specific examples include the solvents marketed under the product names listed below, including Teclean N-16, Teclean N-20, Teclean N-22, Naphtesol L, Naphtesol M, Naphtesol H, No. 0 Solvent L, No. 0 Solvent M, No. 0 Solvent H, Isosol 300, Isosol 400, AF Solvent No. 4, AF Solvent No. 5, AF Solvent No. 6, AF Solvent No. 7, and Cactus Normal Paraffin N12, N13, N14, YHNP and SHNP (all manufactured by JX Nippon Oil & Energy Corporation); and Isopar G; Isopar H, Isopar L, Isopar M, Exxsol D40, Exxsol D80, Exxsol D100, Exxsol D130 and Exxsol D140 (all manufactured by TonenGeneral Sekiyu K.K.). Examples of aromatic hydrocarbon solvents include Grade Alkene L and Grade Alkene 200P (both manufactured by JX Nippon Oil & Energy Corporation), and Solvesso 200 (manufactured by TonenGeneral Sekiyu K.K.). The 50% distillation point of the non-polar organic solvent is preferably at least 100° C., more preferably 150° C. or higher, and even more preferably 200° C. or higher. The 50% distillation point is measured in accordance with JIS 10066 "Test Methods for Distillation of Chemical Products", and represents the temperature at which 50% of the mass of the solvent has volatilized.

Among polar organic solvents, examples of preferred water-insoluble polar organic solvents include ester-based solvents, higher alcohol-based solvents and higher fatty acid-based solvents. Specific examples include ester-based solvents having a carbon number of 14 or higher within each molecule, such as methyl laurate, isopropyl laurate, isopropyl myristate, isopropyl palmitate, isostearyl palmitate, methyl oleate, ethyl oleate, isopropyl oleate, butyl oleate, methyl linoleate, isobutyl linoleate, ethyl linoleate, isopropyl isostearate, methyl soybean oil, isobutyl soybean oil, methyl tallate, isobutyl tallate, diisopropyl adipate, diisopropyl sebacate, diethyl sebacate, propylene glycol monocaprate, trimethylolpropane tri-2-ethylhexanoate and glyceryl tri-2-ethylhexanoate; higher alcohol-based solvents having a carbon number of 8 or higher within each molecule, such as isomyristyl alcohol, isopalmityl alcohol, isostearyl alcohol and oleyl alcohol; and higher fatty acid-based solvents having a carbon number of 9 or higher within each molecule, such as isononanoic acid, isomyristic acid, hexadecanoic acid, isopalmitic acid, oleic acid and isostearic acid.

These solvents may be used individually, or a plurality of solvents may be combined.

Among these solvents, the solvent A is preferably a non-polar organic solvent, and is more preferably a naphthene-based, paraffin-based or isoparaffin-based hydrocarbon solvent.

The solvent A preferably has a Hansen solubility parameter (HSP value) of 14 to 18 MPa/cm$^3$. Further, the solvent A preferably has a dispersion parameter δd of 12 to 20, a polar parameter δp of 0 to 4, and a hydrogen bonding parameter δh of 0 to 4.

By ensuring that the solubility parameters of the solvent A satisfy the above ranges, and that that the solubility parameters of the acidic compound and the solid resin of the colored resin particles satisfy the ranges described above, the dispersion stability of the colored resin particles in the solvent A can be improved. Further, when printing is performed using the colored resin particle dispersion, separation of the colored resin particles and the non-aqueous solvent on the paper can be accelerated, thereby enhancing the fixability of the colored resin particles to the paper and improving the abrasion resistance. This type of fixability effect manifests particularly strongly when printing to relatively impermeable papers such as coated papers.

In terms of the combination of the solid resin and the solvent A, the ΔHSP value described below is preferably within a range from 14 to 25.

$$\Delta \text{HSP}^2 = (\delta d_{solid\ resin} - \delta d_{solvent\ A})^2 + (\delta p_{solid\ resin} - \delta p_{solvent\ A})^2 + (\delta h_{solid\ resin} - \delta h_{solvent\ A})^2$$

Similarly, in terms of the combination of the acidic compound and the solvent A, the ΔHSP value described below is preferably within a range from 14 to 25.

$$\Delta \text{HSP}^2 = (\delta d_{acidic\ compound} - \delta d_{solvent\ A})^2 + (\delta p_{acidic\ compound} - \delta p_{solvent\ A})^2 + (\delta h_{acidic\ compound} - \delta h_{solvent\ A})^2$$

By ensuring that these ΔHSP values satisfy the above ranges, the dispersion stability of the colored resin particles in the solvent A can be further improved, and the separation of the colored resin particles and the non-aqueous solvent on paper can be accelerated, thereby further improving the fixability to the paper.

The 50% distillation point of the solvent A is preferably not higher than 400° C., and is more preferably 300° C. or lower. On the other hand, in order to prevent volatilization of the solvent A and maintain the stability of the colored resin particle dispersion, the lower limit for the 50% distillation point of the solvent A is preferably at least 100° C., and more preferably 150° C. or higher.

The basic dispersant is a dispersant having a basic group. The basic dispersant preferably has a higher solubility in the solvent A than in the solvent B.

The solubility of the basic dispersant in the solvent B at 23° C. is preferably not more than 3 g/100 g, and more preferably 0.5 g/100 g or less. Further, the solubility of the basic dispersant in the solvent A at 23° C. is preferably at least 3 g/100 g, and more preferably 5 g/100 g or greater. It is even more preferable that the basic dispersant is selected so that, in the blend proportions used in the oil-in-oil emulsion, the basic dispersant dissolves essentially completely in the solvent A, and undergoes essentially no dissolution in the solvent B.

The basic dispersant is preferably a compound for which, when the basic dispersant is dissolved in a non-aqueous solvent, the oxidation-reduction potential (ORP value) decreases as the concentration of the basic dispersant increases.

For example, when the basic dispersant is dissolved in a solvent capable of dissolving the basic dispersant, it is preferable that the ORP value when the basic dispersant is dissolved in an amount of 5.0 mass % is lower than the ORP value when the basic dispersant is dissolved in an amount of 0.5 mass %.

Further, the ORP value when the basic dispersant is dissolved in dodecane in an amount of 5.0 mass % is preferably not higher than 0 mV.

On the other hand, if the basic dispersant includes an acidic group as well as the basic group, then the compound can still be used favorably as the basic dispersant, despite containing an acidic group, provided the ORP value exhibits this tendency to decrease. It is preferable that the basic dispersant does not contain an acidic group.

Examples of the basic group of the basic dispersant include an amino group, amide group and pyridyl group, and among these, an amino group is preferable. Further, other examples of the basic group of the basic dispersant include nitrogen-containing functional groups having a urethane linkage or the like. Furthermore, nitrogen-containing structural units such as a urethane linkage may be introduced into the basic dispersant.

Examples of the basic dispersant include modified polyurethanes, basic group-containing poly(meth)acrylates, basic group-containing polyesters, polyesteramines, quaternary ammonium salts, alkylamine salts such as stearylamine acetate, and fatty acid amine salts. These compounds may be used individually, or a plurality of compounds may be combined.

Examples of commercially available basic dispersants include "Solsperse 13940 (a polyester amine-based dispersant), 17000 and 18000 (fatty acid amine-based dispersants), and 11200, 22000, 24000 and 28000" (all product names), manufactured by Lubrizol Japan Ltd., "DISPERBYK-116, 2096 and 2163" (all product names), manufactured by BYK-Chemie Japan K.K., "ACETAMIN 24 and 86 (alkylamine salt-based dispersants)" (both product names), manufactured by Kao Corporation, and "DISPARLON KS-860 and KS-873N4 (high-molecular weight polyester amine salts) (both product names), manufactured by Kusumoto Chemicals, Ltd.

The basic dispersant preferably has a base value. The base value of the basic dispersant is preferably at least 1 mgKOH/g, more preferably 10 mgKOH/g or higher, and even more preferably 15 mgKOH/g or higher. This ensures that a fine and stable colored resin particle dispersion can be prepared. Further, by using a basic dispersant having a high base value, the amount of the basic dispersant required to adjust the oxidation-reduction potential need only be small, meaning any increase in the viscosity of the colored resin particle dispersion can be suppressed.

The basic dispersant preferably contains a (meth)acrylic block polymer having basic groups. Here, the term "(meth)acrylic block polymer" means both methacrylic block polymers and acrylic block polymers, and includes homopolymers containing only methacrylic units or acrylic units, and copolymers containing both methacrylic units and acrylic units.

By using a (meth)acrylic block polymer having basic groups as the basic dispersant, the viscosity of the colored resin particle dispersion can be suppressed to a low level, and the average particle size of the colored resin particles can be kept small. As a result, an ink that is particularly suited to inkjet discharge can be obtained.

One example of a preferred (meth)acrylic block polymer having basic groups is a block copolymer having a first block containing units having an alkyl group with a carbon number of 12 or greater, and a second block containing units having an amino group.

With this block copolymer, because the alkyl group portions exhibit good solvent affinity and the amino group portions exhibit good affinity with the colored resin particles, the dispersibility of the colored resin particles can be enhanced. Further, the emulsion stability when preparing the oil-in-oil emulsion can also be enhanced. Because of the block polymer structure, the alkyl group portions are localized, the alkyl group portions are readily orientated on the solvent side, and the solvent affinity can be further enhanced.

The alkyl group with a carbon number of 12 or greater may be either a linear or branched alkyl group, and specific examples include a dodecyl group, cetyl group, stearyl group, behenyl group, isododecyl group and isostearyl group.

These alkyl groups with a carbon number of 12 or greater may be incorporated in the first block either individually, or in combinations of two or more different groups.

Examples of groups that can be used as the amino group include groups represented by general formula $-NR^1R^2$, wherein each of $R^1$ and $R^2$ independently represents a hydrogen atom, a hydrocarbon group having a carbon number of 18 or less, or an alkanol group having a carbon number of 8 or less.

Examples of the hydrocarbon groups having a carbon number of 18 or less include chain-like hydrocarbon groups such as a methyl group, ethyl group, propyl group and butyl group, and cyclic hydrocarbon groups such as a cyclohexyl group and phenyl group. Examples of the alkanol group having a carbon number of 8 or less include an ethanol group and an isopropanol group.

The amino group is preferably a dialkanolamino group represented by general formula $-N(HOR)_2$ (wherein R represents a divalent hydrocarbon group).

The molar ratio between the first block and the second block is preferably from 20:80 to 90:10, and more preferably from 30:70 to 70:30.

The first and second blocks may each contain other groups besides the alkyl group with a carbon number of 12 or more and the amino group respectively. Examples of these other groups include alkyl groups having a carbon number of less than 12, and a benzyl group and the like.

One example of a preferred (meth)acrylic polymer having basic groups is a block copolymer having a block A of a monomer mixture a containing an alkyl (meth)acrylate (A) having an alkyl group with a carbon number of 12 or greater (hereafter also referred to as "monomer (A)"), and a block B of a monomer mixture b containing a reactive (meth)acrylate (B) having a functional group that can react with an amino group (hereafter also referred to as "monomer (B)") (hereafter this block copolymer is also referred to as simply a "(meth)acrylic block polymer"), wherein the functional group that can react with an amino group is reacted with an amino alcohol to introduce an amino group. Hereafter this block copolymer is sometimes referred to as simply an "amine-modified (meth)acrylic block polymer".

In this amine-modified (meth)acrylic block polymer, the introduced amino alcohol portions function as oil-in-oil emulsion interface adsorption groups, and also as adsorption groups for the colored resin particles, whereas the alkyl groups with a carbon number of 12 or greater exhibit good solvent affinity, and can enhance the emulsion stability of the oil-in-oil emulsion and the dispersibility of the colored resin particles.

Examples of the alkyl (meth)acrylate (A) having an alkyl group with a carbon number of 12 or greater include dodecyl (meth)acrylate, cetyl (meth)acrylate, stearyl (meth)acrylate, behenyl (meth)acrylate, isododecyl (meth)acrylate, and isostearyl (meth)acrylate. A plurality of these compounds may also be included. The carbon number of the alkyl group is preferably from 12 to 25.

Preferred examples of the functional group that can react with an amino group in the reactive (meth)acrylate (B) include a glycidyl group, vinyl group, and (meth)acryloyl group. An example of the monomer (B) having a glycidyl group is glycidyl (meth)acrylate, and examples of the monomer (B) having a vinyl group include vinyl (meth)acrylate and 2-(2-vinyloxyethoxy)ethyl (meth)acrylate. Examples of the monomer (B) having a (meth)acryloyl group include dipropylene glycol di(meth)acrylate and 1,6-hexanediol di(meth)acrylate. A plurality of these compounds may also be included.

The monomer mixtures a and b may each include a copolymerizable monomer (C) other than the aforementioned monomer (A) or (B) respectively, provided that the effects of the present invention are not impaired.

Examples of this monomer (C) include styrene-based monomers such as styrene and α-methylstyrene; vinyl ether-based monomers such as vinyl acetate, vinyl benzoate and butyl vinyl ether; as well as maleate esters, fumarate esters, acrylonitrile, methacrylonitrile and α-olefins. Further, alkyl (meth)acrylates in which the alkyl chain length has a carbon number of less than 12, such as 2-ethylhexyl (meth)acrylate, isooctyl (meth)acrylate and tert-octyl (meth)acrylate can also be used. Furthermore, (meth)acrylates having a β-diketone group or a β-keto acid ester group, including acetoacetoxyalkyl (meth)acrylates such as 2-acetoacetoxyethyl (meth)acrylate, hexadione (meth)acrylate, and acetoacetoxyalkyl (meth)acrylamides such as acetoacetoxyethyl (meth)acrylamide can also be used. These monomers may be used individually, or a combination of two or more monomers may be used.

Examples of the amino alcohol include monomethylethanolamine, diethanolamine and diisopropanolamine. Among the various possibilities, from the viewpoint of providing two hydroxyl groups and thereby increasing the number of reactive sites, a dialkanolamine (secondary alkanolamine) represented by general formula $(HOR)_2NH$ (wherein R represents a divalent hydrocarbon group) is preferable. A combination of a plurality of these amino alcohols may also be used.

In order to enable the introduction of amino groups and ensure satisfactory dispersion of the colored resin particles, this amino alcohol is preferably reacted in an amount within a range from 0.05 to 1 molar equivalent, and more preferably from 0.5 to 1 molar equivalent, relative to the functional group that can react with an amino group in the aforementioned monomer (B). An amount of the amino alcohol of less than 1 molar equivalent means some unreacted functional groups will remain within the monomer (B), but it is thought that these residual functional groups function as adsorption groups for the colored resin particles.

In one example of a method of synthesizing the amine-modified (meth)acrylic block polymer, in a first stage, one of the monomer mixture a containing the monomer (A) and the monomer mixture b containing the monomer (B) is polymerized to obtain a first block, in a second stage, the other monomer mixture is polymerized in the presence of this first block, thereby linking a block of the other monomer mixture to the terminal of the first block and yielding a polymerized (meth)acrylic block polymer, and in a subsequent third stage, diethanolamine is reacted with this (meth)acrylic block polymer to obtain the amine-modified (meth)acrylic block polymer.

There are no particular limitations on the molecular weight (weight-average molecular weight) of the amine-modified (meth)acrylic block polymer, but in the case of use as an inkjet ink, from the viewpoint of the discharge properties of the ink, the molecular weight is preferably about 10,000 to 100,000, and more preferably about 10,000 to 80,000. Moreover, in the dispersant of the present embodiment, a molecular weight of about 20,000 to 50,000 enables excellent dispersion stability to be obtained.

The molecular weight of this amine-modified (meth)acrylic block polymer is substantially the same as the molecular weight of the (meth)acrylic block polymer prior to reaction with the amino alcohol, and therefore by adjusting the molecular weight in the polymerization process for the (meth)acrylic block polymer, an amine-modified (meth)acrylic block polymer having a molecular weight within the desired range can be obtained.

Within the amine-modified (meth)acrylic block polymer, the weight-average molecular weight of the block A portion polymerized from the monomer mixture a containing the monomer (A) is preferably about 5,000 to 40,000, and more preferably about 8,000 to 30,000, This ensures that the solvent affinity of the block A portion falls within a more suitable range.

Another example of the (meth)acrylic block polymer having basic groups is a block copolymer having a block A of a monomer mixture a containing an alkyl (meth)acrylate (A) having an alkyl group with a carbon number of 12 or greater, and a block B of a monomer mixture b containing a reactive (meth)acrylate (B) having an amino group.

In this example, (meth)acrylates having a tertiary amino group can be used favorably as the (meth)acrylate (B) having an amino group. Specifically, dimethylaminoethyl (meth)acrylate, diethylaminoethyl (meth)acrylate, dimethylaminopropyl methacrylamide, or dipropylaminoethyl (meth)acrylamide or the like may be used individually, or in combinations containing a plurality of these compounds.

This (meth)acrylic block polymer having basic groups can be obtained by a method in which, in a first stage, one of the monomer mixture a containing the monomer (A) and the monomer mixture b containing the monomer (B) having an amino group is polymerized to obtain a first block, and in a second stage, the other monomer mixture is polymerized in the presence of this first block, thereby linking a block of the other monomer mixture to the terminal of the first block.

From the viewpoints of the stability of the emulsion and the dispersibility of the colored resin particles, the amount of the basic dispersant within the continuous phase is preferably from 0.1 to 15 mass %, and more preferably from 1 to 10 mass %, relative to the total mass of the continuous phase.

From the viewpoint of the dispersibility of the colored resin particles, the amount of the basic dispersant following removal of the solvent B is preferably from 0.1 to 20 mass %, and more preferably from 1 to 15 mass %, relative to the total mass of the colored resin particle dispersion.

Other optional components such as antioxidants, surface tension regulators and antifoaming agents may be added to the continuous phase, provided they do not impair the effects of the present invention.

In the present embodiment, a base or an acid may be added to the continuous phase to adjust the oxidation-reduction potential of the dispersion. This base or acid is preferably soluble in the solvent A within the continuous phase.

The base or acid may be added following preparation of the oil-in-oil emulsion, or may also be added following removal of the solvent B after preparation of the oil-in-oil emulsion. However, from the viewpoint of the emulsion stability of the oil-in-oil emulsion, the base or acid is preferably added in advance to the continuous phase.

Due to the inclusion of the acidic compound, the colored resin particle dispersion tends to have a large oxidizing power overall. Adding a base to this dispersion having a large oxidizing power is preferable in terms of reducing the oxidation-reduction potential.

Examples of the base include organic amines such as primary, secondary and tertiary aliphatic amines, alicyclic amines, and aromatic amines.

Specific examples of these organic amines include dicyclohexylamine, cyclohexylamine, dicyclopentylamine, tricyclohexylamine, dipentylamine, dihexylamine, tripentylamine, trihexylamine, diphenyl(p-tolyl)amine, methyldiphenylamine, triphenylamine, phenylenediamine, naphthylamine, and diaminonaphthalene.

These bases may be used individually, or a combination of two or more bases may be used.

Depending on the basic dispersant included in the colored resin particle dispersion, the reducing power may increase overall. An acid may be added to such a dispersion having a large reducing power to increase the oxidation-reduction potential.

Examples of the acid include saturated fatty acids such as lauric acid and myristic acid, unsaturated fatty acids such as linoleic acid, oleic acid and palmitoleic acid, and acidic dispersant such as carboxylate esters, partial alkyl esters of polycarboxylic acids, phosphate esters and alkylbenzene sulfonate esters, which may be used individually or in combinations containing two or more acids.

Further, when the reducing power of the dispersion is large, the reducing power can also be reduced by altering the type and blend amount of the acidic compound, so that the oxidation-reduction potential can be brought closer to 0.

The blend amount of the base or acid added to the continuous phase can be set as appropriate, so as to adjust the oxidation-reduction potential of the overall dispersion, as well as stabilize the dispersion system.

For example, the amount of the base or acid added to the continuous phase is preferably from 0.1 to 20 mass %, and more preferably from 0.5 to 10 mass %, relative to the total mass of the continuous phase.

When a base or an acid is added to the continuous phase, the amount of the base or acid following removal of the solvent B is preferably from 0.1 to 15 mass %, and more preferably from 0.5 to 8 mass %, relative to the total mass of the colored resin particle dispersion.

Dispersed Phase

The dispersed phase contains the solvent B, the colorant, the solid resin and the acidic compound.

The solubility of the solvent B in the aforementioned solvent A at 23° C. is preferably not more than 3 g/100 g, and the boiling point of the solvent B is preferably lower than that of the solvent A.

The solvent B is preferably a polar organic solvent, and is more preferably a lower alcohol-based solvent. Examples of this lower alcohol-based solvent include isopropyl alcohol, ethylene glycol, ethanol, methanol, propanol and butanol. Lower alcohol-based solvents having a carbon number of 4 or less are particularly preferable.

Other specific examples of the solvent B include acetone, methyl ethyl ketone, and ethyl acetate and the like. Moreover, the solvent B may be selected appropriately so as to satisfy specific relationships with the aforementioned solvent A, the basic dispersant and the solid resin.

These solvents may be used individually, or a plurality of solvents may be combined.

The solubility of the solvent B in the solvent A at 23° C. is preferably not more than 3 g/100 g, and is more preferably 1 g/100 g or less, and even more preferably 0.5 g/100 g or less. It is even more preferable that the solvent B is essentially insoluble in the solvent A.

The difference in the boiling points of the solvent B and the solvent A is preferably at least 10° C., more preferably 20° C. or greater, and even more preferably 50° C. or greater. In the case of a mixed solvent such as a petroleum-based hydrocarbon solvent, the 50% distillation point is used as the boiling point. Further, the boiling point of the solvent B is preferably not higher than 100° C., and is more preferably 90° C. or lower. On the other hand, there are no particular limitations on the lower limit for the boiling point of the solvent B, provided the solvent B is liquid within a range from −20 to 90° C.

The solvent B preferably has a Hansen solubility parameter (HSP value) of 18 to 30 MPa/cm$^3$, and more preferably 20 to 30 MPa/cm$^3$. Further, the solvent B preferably has a dispersion parameter δd of 14 to 17, a polar parameter δp of 5 to 15, and a hydrogen bonding parameter δh of 5 to 25, and more preferably has a dispersion parameter δd of 14 to 17, a polar parameter δp of 5 to 15, and a hydrogen bonding parameter δh of 15 to 25.

By ensuring that the solubility parameters of the solvent B satisfy the above ranges, the solubility in the solvent A can be kept low, and the solvent can be provided with the ability to dissolve both the colored resin particles and the solid resin. Provided the solubility parameters of the colored resin particles and the solid resin satisfy the ranges described above, they will dissolve in the solvent B but be insoluble in the solvent A, meaning good dispersion stability can be obtained.

Further, it is preferable that the solvent A is a hydrocarbon-based solvent, and the solvent B is an alcohol-based solvent having a carbon number of 4 or less. Preferred examples of the hydrocarbon-based solvent include naphthene, paraffin, and isoparaffin and the like, whereas preferred examples of the alcohol-based solvent having a carbon number of 4 or less include methanol, ethanol, propanol and butanol, with methanol being particularly preferable.

The colorant may be a dye or a pigment, or a combination thereof. Details are as described above.

By ensuring that the dye has a higher solubility in the solvent B than in the solvent A, the dye and the solid resin can be dissolved in the solvent B in the dispersed phase, enabling a stable colored resin particle dispersion to be provided.

The solubility of the dye in the solvent A at 23° C. is preferably not more than 0.5 g/100 g, and more preferably 0.1 g/100 g or less. Further, the solubility of the dye in the solvent B at 23° C. is preferably at least 0.5 g/100 g, and more preferably 1 g/100 g or greater. It is even more preferable that in the blend proportions used in the oil-in-oil emulsion, the dye dissolves essentially completely in the solvent B, and undergoes essentially no dissolution in the solvent A.

The amount of the colorant relative to the total mass of the dispersed phase, reported as a combined amount of the pigments and dyes relative to the entire dispersed phase, is preferably from 0.1 to 50 mass %, more preferably from 1 to 40 mass %, and even more preferably from 2 to 20 mass %. This enables the solubility or dispersibility of the colorant in the solvent B to be stabilized.

Following removal of the solvent B, the amount of the colorant relative to the total mass of the colored resin particle dispersion, reported as a combined amount of the pigments and dyes relative to the entire colored resin particle dispersion, is preferably from 0.1 to 50 mass %, more preferably from 1 to 40 mass %, and even more preferably from 2 to 20 mass %. This ensures that the coloring of the colored resin particles is appropriate, and that the shape of the particles can be stabilized.

When a pigment is used for the colorant, in order to ensure stable dispersion of the pigment within the dispersed phase, namely within the solvent B, a pigment dispersant may be included in the dispersed phase.

An anionic dispersant, cationic dispersant or nonionic dispersant may be used as the pigment dispersant, and the dispersant may be selected appropriately in accordance with the other components of the emulsion. Further, the pigment dispersant may use a high-molecular weight compound or a low molecular weight compound (surfactant).

Examples of the pigment dispersant include hydroxyl group-containing carboxylate esters, salts of high-molecular weight polycarboxylic acids, naphthalenesulfonic acid formalin condensate salts, polyoxyethylene alkyl phosphate esters, salts of long-chain polyaminoamides and high-molecular weight acid esters, salts of long-chain polyaminoamides and polar acid esters, polyester polyamines, stearylamine acetate, high-molecular weight unsaturated acid esters, polyoxyethylene nonylphenyl ethers, high-molecular weight copolymers, modified polyurethanes, and modified polyacrylates and the like. These dispersants may be used individually, or a plurality of dispersants may be combined.

The pigment dispersant preferably has a higher solubility in the solvent B than in the solvent A, and for example the solubility in the solvent B at 23° C. is preferably at least 3 g/100 g, and more preferably 5 g/100 g or greater. It is even more preferable that the pigment dispersant is selected so that, in the blend proportions used in the oil-in-oil emulsion, the pigment dispersant dissolves essentially completely in the solvent B, and undergoes essentially no dissolution in the solvent A.

A compound that exhibits pigment dispersion properties, selected from among the acidic compounds described above, may be used as the anionic dispersant.

Examples of commercially available products that can be used as the acidic compound used as the anionic dispersant include "DISPERBYK 102, 108, 110 and 111" (all product names) manufactured by BYK-Chemie Japan K.K., "TEGO Dispers 655" manufactured by Tomoe Engineering Co., Ltd., and "Efka 6230" manufactured by Efka Chemicals B.V. All of these products exhibit good solubility in the solvent B.

For the cationic dispersant, nitrogen-containing compounds having an amino group, amide group, pyridyl group, or urethane linkage or the like can be used favorably, and among such compounds, nitrogen-containing compounds having an amino group are preferable.

Examples of commercially available products that can be used as the cationic dispersant include "Solsperse 71000" manufactured by The Lubrizol Corporation, and "DISPER- BYK 2155 and 9077" manufactured by BYK-Chemie Japan K.K. All of these products exhibit good solubility in the solvent B.

When a cationic dispersant is used as the pigment dispersant, the base value of the cationic dispersant is preferably at least 1 mgKOH/g, more preferably 10 mgKOH/g or greater, and even more preferably 20 mgKOH/g or greater. This enhances the affinity with the pigment, and can improve the dispersion performance.

The blend amount of the pigment dispersant within the dispersed phase can be set as appropriate, but from the viewpoint of the pigment dispersibility, the mass ratio relative to 1 part of the pigment is preferably about 0.05 to 2.0 parts, more preferably from 0.1 to 1.0 parts, and even more preferably from 0.2 to 0.6 parts.

The solid resin is preferably a resin that is solid at room temperature (23° C.). Details are as described above.

When the colored resin particles are produced via an oil-in-oil emulsion, it is preferable that this solid resin has a higher solubility in the solvent B than in the solvent A.

The solubility of the resin in the solvent B at 23° C. is preferably at least 10 g/100 g, and more preferably 20 g/100 g or greater. Further, the solubility of the resin in the solvent A at 23° C. is preferably not more than 3 g/100 g, and more preferably 0.5 g/100 g or less. It is even more preferable that, in the blend proportions used in the oil-in-oil emulsion, the resin dissolves essentially completely in the solvent B, and undergoes essentially no dissolution in the solvent A.

The amount of the solid resin in the dispersed phase, relative to the total mass of the dispersed phase, is preferably from 0.1 to 50 mass %, more preferably from 1 to 40 mass %, and even more preferably from 2 to 20 mass %. This enables appropriate solubility of the resin within the solvent B, and enables a more even distribution of the components of the colored resin particles.

The amount of the solid resin relative to the total mass of the colored resin particle dispersion following removal of the solvent B is preferably from 0.1 to 50 mass %, more preferably from 1 to 40 mass %, and even more preferably from 2 to 20 mass %. This ensures that the coloring of the colored resin particles is appropriate, and that the shape of the particles can be stabilized.

The mass ratio between the solid resin and the colorant preferably satisfies (mass of solid resin)/(mass of colorant) ≥0.5. When this range is satisfied, mixing and stirring of the continuous phase and the dispersed phase is able to provide an oil-in-oil emulsion having excellent emulsion stability.

The acidic compound is a liquid organic compound having an acidic group. Details are as described above.

By adding the acidic compound, the abrasion resistance of the printed items can be further improved. This is because the acidic compound enables the colorant and the solid resin to be blended more uniformly and stably.

Further, when a resin having a low acid value and superior water resistance is used as the solid resin, the abrasion resistance can sometimes deteriorate, but by adding the acidic compound together with this type of solid resin, the water resistance and the abrasion resistance can be improved.

Furthermore, the acidic compound can enhance the stability of the oil-in-oil emulsion during the production process for the colored resin particle dispersion.

There are no particular limitations on the acidic compound, but the compound preferably has a higher solubility in the solvent B than in the solvent A. The solubility of the acidic compound in the solvent B at 23° C. is preferably at least 1 g/100 g, and more preferably 2 g/100 g or greater.

Further, the solubility of the acidic compound in the solvent A at 23° C. is preferably not more than 3 g/100 g, and more preferably 0.5 g/100 g or less. It is even more preferable that, in the blend proportions used in the oil-in-oil emulsion, the acidic compound dissolves essentially completely in the solvent B, and undergoes essentially no dissolution in the solvent A.

The amount of the acidic compound in the dispersed phase, relative to the total mass of the dispersed phase, is preferably from 0.1 to 25 mass %, and more preferably from 1 to 20 mass %. This enables the emulsion to be better stabilized.

The amount of the acidic compound relative to the total mass of the colored resin particle dispersion following removal of the solvent B is preferably from 0.1 to 20 mass %, and more preferably from 1 to 15 mass %. This enables the abrasion resistance to be further enhanced.

The mass ratio between the acidic compound and the colorant preferably satisfies (mass of acidic compound)/(mass of colorant)≥0.5. When this range is satisfied, mixing and stirring of the continuous phase and the dispersed phase is able to provide an oil-in-oil emulsion having excellent emulsion stability.

Other optional components such as antifoaming agents, antioxidants and surface tension regulators may be added to the dispersed phase, provided they do not impair the effects of the present invention. An aforementioned plasticizer may also be added to the dispersed phase.

In the present embodiment, in order to adjust the oxidation-reduction potential of the dispersion, a base or an acid may be added to the dispersed phase, in the same manner as that described above for the continuous phase. This base or acid is preferably soluble in the solvent B of the dispersed phase.

Examples of bases that can be added favorably to the dispersed phase include methylamine, diisopropylamine, triethylamine and 2-ethylhexylamine.

Examples of acids that can be added favorably to the dispersed phase include valeric acid, caproic acid and caprylic acid.

The blend amount of the base or acid added to the dispersed phase can be set as appropriate, so as to adjust the oxidation-reduction potential of the overall dispersion, as well as stabilize the dispersion system.

For example, the amount of the base or acid added to the dispersed phase is preferably from 0 to 3 mass %, and more preferably from 0.1 to 1 mass %, relative to the total mass of the dispersed phase.

When a base or an acid is added to the dispersed phase, the amount of the base or acid following removal of the solvent B is preferably from 0 to 3 mass %, and more preferably from 0.1 to 1 mass %, relative to the total mass of the colored resin particle dispersion.

Method of Preparing Dispersion

The method used for preparing the colored resin particle dispersion is not particularly limited, and the dispersion can be prepared by dispersing the dispersed phase described above in the continuous phase described above to prepare an oil-in-oil emulsion, and then removing the non-aqueous solvent B from the dispersed phase of the oil-in-oil emulsion under reduced pressure and/or heating.

For example, the continuous phase and the dispersed phase can be prepared by mixing the various components described above. Subsequently, the dispersed phase can be dispersed in the continuous phase by mixing and stirring the two phases while the dispersed phase is added dropwise to the continuous phase. At this time, the mixing and stirring can be performed using an ultrasonic homogenizer. The non-aqueous solvent B is then removed from the obtained oil-in-oil emulsion under reduced pressure and/or heating. At this time, the degree of pressure reduction and/or heating is adjusted so that the non-aqueous solvent B is removed but the non-aqueous solvent A is retained.

When a pigment is used as the colorant, examples of the method used for dispersing the pigment in the dispersed phase include methods using typical wet dispersion devices such as a ball mill, beads mill, ultrasound, homomixer or high-pressure homogenizer.

Further, the mass ratio between the continuous phase and the dispersed phase in the oil-in-oil emulsion can be adjusted within a range from 40:60 to 95:5. The amount added of the non-aqueous solvent B is preferably from 5 to 40 mass %, and more preferably from 5 to 30 mass %, relative to the total mass of the oil-in-oil emulsion. Further, the amount removed of the non-aqueous solvent B is preferably the total amount added of the non-aqueous solvent B, but any amount that is 90 mass % or more of the total amount added of the non-aqueous solvent B is acceptable.

Another example of the method used for producing the colored resin particle dispersion is a method in which the components of the dispersed phase are prepared independently as a plurality of mixed liquids, and these mixed liquids are then added dropwise, either simultaneously or sequentially, to the continuous phase to prepare the oil-in-oil emulsion.

Specifically, a method can be used in which a phase containing at least the basic dispersant and a non-aqueous solvent (the solvent A) is used as the continuous phase, a phase which does not contain the colorant or the solid resin, but contains at least the acidic compound and a non-aqueous solvent (the solvent B) is used as the dispersed phase, the continuous phase and the dispersed phase are mixed together to prepare an oil-in-oil (O/O) pre-emulsion, a mixed liquid containing the colorant, the solid resin and a non-aqueous solvent (the solvent B) is then added to this pre-emulsion to prepare an oil-in-oil (O/O) emulsion, and the solvent B from the dispersed phase and the added solvent B from the mixed liquid is then removed under reduced pressure and/or heating to obtain the colored resin particle dispersion. In the following description, this method is sometimes referred to as a two-stage emulsification method.

In order to ensure stable preparation of the oil-in-oil emulsion, the solvent B preferably exhibits low solubility in the solvent A. Further, in order to enable removal of the solvent B, the solvent B preferably has a lower boiling point than that of the solvent A.

In order to ensure stable preparation of the oil-in-oil emulsion, the basic dispersant preferably has a higher solubility in the solvent A than in the solvent B. Further, in order to stabilize the shape of the colored resin particles, the resin preferably has a higher solubility in the solvent B than in the solvent A.

In the two-stage emulsification method, aggregation of the colorant can be prevented in the process of preparing the colored resin particles, enabling finer colored resin particles to be provided. In the process for preparing the colored resin particles, the colorant may sometimes interact and aggregate with other components, and particularly with the acidic compound, but in this two-stage emulsification method, because the colorant is added afterward as an individual component, this type of aggregation can be prevented.

Colored resin particles of fine particle size are particularly suited to inkjet inks.

In the two-stage emulsification method, unless specifically mentioned otherwise, the various components used in the oil-in-oil emulsion are the same as those described above. The aggregation problem can be remedied regardless of whether the colorant is a pigment or a dye.

In the continuous phase, the blend amounts of the basic dispersant and the solvent A are the same as those used in the one-stage emulsification method described above.

In the dispersed phase, the amount of the acidic compound, relative to the total mass of the dispersed phase, is preferably from 1 to 70 mass %, and more preferably from 10 to 50 mass %.

The amount of the colorant in the mixed liquid, relative to the total mass of the mixed liquid, is preferably from 5 to 40 mass %, and more preferably from 10 to 30 mass %. When the colorant is a pigment, a pigment dispersant may also be added to the mixed liquid.

The amount of the solid resin in the mixed liquid, relative to the total mass of the mixed liquid, is preferably from 5 to 40 mass %, and more preferably from 10 to 30 mass %.

In the colored resin particle dispersion obtained by the two-step emulsification method, each of the components is preferably included in a prescribed proportion, in the same manner as described above for the one-step emulsification method.

In the colored resin particle dispersion, the average particle size of the colored resin particles is preferably the same as described above.

The average particle size of the colored resin particles can be controlled by adjusting the amount of the basic dispersant added to the continuous phase, or the amount of the non-volatile fraction included in the dispersed phase or the like. Because the acidic compound is added, the average particle size of the colored resin particles can be kept to a smaller size.

(Ink)

The ink according to the present embodiment is an ink containing the colored resin particle dispersion described above. This ink can be used as a general-purpose printing ink for inkjet printing, offset printing, stencil printing, or gravure printing or the like. Because the ink has good dispersion stability, use of the ink as an inkjet ink is particularly preferable.

When used as an inkjet ink, the colored resin particle dispersion can be used as is, but if required, may include any of the various additives typically used in the field, provided these additives do not impair the objects of the present invention. For example, nozzle blockage prevention agents, antioxidants, conductivity modifiers, viscosity modifiers, surface tension regulators, and oxygen absorbers and the like may be added as appropriate. There are no particular limitations on the types of these additives, and any additives used in the field can be used. Further, the colored resin particle dispersion may be diluted with a non-aqueous solvent described above.

The ideal range for the viscosity of the inkjet ink varies depending on factors such as the diameter of the nozzles within the discharge head of the inkjet recording system and the discharge environment, but generally, the viscosity at 23° C. is preferably within a range from 5 to 30 mPa·s, more preferably from 5 to 15 mPa·s, and most preferably about 10 mPa·s. In this description, the viscosity describes a value measured at 23° C. by raising the shear stress from 0 Pa at a rate of 0.1 Pa·ls, and refers to the measured value at 10 Pa.

There are no particular limitations on the printing method using the inkjet ink, and any of various printing systems, including a piezo system, electrostatic system or thermal system may be used. In those cases where an inkjet recording device is used, the ink of the present embodiment is preferably discharged from the inkjet head based on a digital signal, with the discharged ink droplets being adhered to the recording medium.

In the present embodiment, there are no particular limitations on the recording medium, and examples of media that can be used include printing papers such as plain papers, coated papers and specialty papers, cloth, inorganic sheets, films and OHP sheets, and adhesive sheets having one of the above media as a base material and having an adhesive layer provided on the rear surface. Among these, from the viewpoint of ink penetration, a printing paper such as a plain paper or coated paper can be used particularly favorably.

Here, plain paper describes a normal paper in which an ink receiving layer or film layer or the like has not been formed on the surface of the paper. Examples of plain papers include high-quality papers, medium-quality papers, PPC papers, woody papers and recycled papers. In a plain paper, paper fibers with a thickness of several μm to several tens of μm are formed with a spacing between fibers of several tens to several hundred μm, and therefore the ink can penetrate readily.

Further, in terms of coated papers, coated papers designed for inkjets, and other so-called coated printing papers can be used favorably. A coated printing paper describes the type of paper that has conventionally been used in relief printing, offset printing, and gravure printing and the like, and is a printing paper in which a coating layer is formed on the surface of a high-quality paper or medium-quality paper using a coating material containing an inorganic pigment such as clay or calcium carbonate and a binder such as starch. Depending on the amount applied of the coating material and the coating method used, coated printing papers are classified into fine coated papers, high-quality lightweight coated papers, medium-quality lightweight coated papers, high-quality coated papers, medium-quality coated papers, art papers, and cast coated papers and the like. Coated printing papers have minimal gaps on the paper surface compared with plain papers and coated papers designed for inkjets, and therefore penetration of the ink is slow, and the ink components are more readily retained on the surface of the paper. As a result, the ink according to the present embodiment is suitable for improving the fixability to coated printing papers.

The present invention can provide a colored resin particle dispersion and an ink which provide excellent abrasion resistance and prevent change in the color tone. Moreover, the invention also provides a colored resin particle dispersion and an ink which exhibit excellent abrasion resistance, together with excellent water resistance and marker resistance.

EXAMPLES

The present invention is described below in further detail using a series of examples, but the present invention is in no way limited by these examples. Unless specifically state otherwise, "%" refers to "mass %".

<Ink Preparation>

Formulations of oil-in-oil emulsions for a series of examples and comparative examples prior to removal of the solvent B are shown in Table 2 to Table 4. In each table, when a dispersant includes a volatile component, the total amount of the dispersant is shown, and the non-volatile fraction amount is also shown in parentheses (this also applies in Tables 5 to 7 below). Further, the units for the acid values and the amine values shown in each of the tables are mgKOH/g.

The continuous phase was prepared by mixing the solvent A and the basic dispersant in the blend amounts shown in each table. Subsequently, the dispersed phase was prepared by mixing the colorant, the solid resin and the acidic compound with the solvent B in the blend amounts shown in each table, and then dispersing the resulting mixture using a beads mill.

With the continuous phase in a state of continuous stirring with a magnetic stirrer under ice cooling, a 10 minute irradiation with an ultrasonic homogenizer (Ultrasonic Processor VC-750, manufactured by Sonics & Materials, Inc.) was conducted while the premixed dispersed phase was added dropwise to the continuous phase, thus obtaining an oil-in-oil (O/O) emulsion.

The solvent B within the dispersed phase was removed from the obtained emulsion under reduced pressure using an evaporator, thus obtaining a colored resin particle dispersion. The rate of removal of the solvent B was essentially 100 mass %. This colored resin particle dispersion was used as an ink with no further modification.

Inks of the examples and comparative examples were also prepared in the same manner as described above, with the following exceptions.

In Examples 2, 3, 9 and 10, dicyclohexylamine was also added to the continuous phase.

The oxidation-reduction potential of each ink was adjusted using the blend amounts of the basic dispersant, the acidic compound and the dicyclohexylamine.

Formulations of the inks of the examples and comparative examples following removal of the solvent B are shown in Table 5 to Table 7. The amount of the non-volatile fraction was determined from the combined total of the amount of each of the non-volatile components (the basic dispersant, the colorant, the solid resin, the acidic compound and the dicyclohexylamine) relative to the total mass of the ink, and this amount of the non-volatile fraction is also shown in each table.

TABLE 2

Formulations of oil-in-oil emulsions of Examples (prior to solvent B removal)

| | | | Example | | | | | |
|---|---|---|---|---|---|---|---|---|
| | Units: mass % | | 1 | 2 | 3 | 4 | 5 | 6 |
| Continuous phase | Solvent A | Isopar M | 68.5 | 68.4 | 68.0 | 67.0 | 67.0 | 64.0 |
| | Basic dispersant | S17000 | 1.5 | 1.5 | 1.5 | 3.0 | | |
| | | S11200 (non-volatile fraction 50%) | | | | | 3.0 (1.5) | 6.0 (3.0) |
| | Additive | Dicyclohexylamine | | 0.1 | 0.5 | | | |

TABLE 2-continued

Formulations of oil-in-oil emulsions of Examples (prior to solvent B removal)

| | | Units: mass % | Example 1 | 2 | 3 | 4 | 5 | 6 |
|---|---|---|---|---|---|---|---|---|
| Dispersed phase | Solvent B | Methanol | 23.5 | 22.5 | 22.5 | 22.5 | 22.5 | 22.5 |
| | Colorant | Black metal complex dye Valifast Black 3810 | 2.5 | 2.5 | 2.5 | 2.5 | 2.5 | 2.5 |
| | Acidic compound | BYK111 (non-volatile fraction 95%) | 1.5 (1.4) | 2.5 (2.4) | 2.5 (2.4) | 2.5 (2.4) | 2.5 (2.4) | 2.5 (2.4) |
| | Solid resin | Polyvinyl alcohol JMR-8L Polyvinyl alcohol JMR-10L | 2.5 | 2.5 | 2.5 | 2.5 | 2.5 | 2.5 |
| Total (mass %) | | | 100.0 | 100.0 | 100.0 | 100.0 | 100.0 | 100.0 |

TABLE 3

Formulations of oil-in-oil emulsions of Examples (prior to solvent B removal)

| | | Units: mass % | Example 7 | 8 | 9 | 10 | 11 |
|---|---|---|---|---|---|---|---|
| Continuous phase | Solvent A | Isopar M | 68.5 | 68.4 | 68.4 | 67.0 | 67.0 |
| | Basic dispersant | S17000 | 1.5 | 1.5 | 1.5 | | |
| | | S11200 (non-volatile fraction 50%) | | | | 3.0 (1.5) | 3.0 (1.5) |
| | Additive | Dicyclohexylamine | | 0.1 | 0.1 | | |
| Dispersed phase | Solvent B | Methanol | 22.5 | 22.5 | 22.5 | 22.5 | 22.5 |
| | Colorant | Red acid dye Water Red 27 | 2.5 | | | | |
| | | Red metal complex dye Orasol Pink 5BLG | | 2.5 | | | |
| | | Red salt-forming dye Valifast Red 1308 | | | 2.5 | | |
| | | Dye lake pigment Seikalight Magenta 2R | | | | 2.5 | |
| | | Black metal complex dye Valifast Black 3830 | | | | | 2.5 |
| | Acidic compound | BYK111 (non-volatile fraction 95%) | 2.5 (2.4) | 2.5 (2.4) | 2.5 (2.4) | 2.5 (2.4) | 2.5 (2.4) |
| | Solid resin | Polyvinyl alcohol JMR-8L Polyvinyl alcohol JMR-10L | 2.5 | 2.5 | 2.5 | 2.5 | 2.5 |
| Total (mass %) | | | 100.0 | 100.0 | 100.0 | 100.0 | 100.0 |

TABLE 4

Formulations of oil-in-oil emulsions of Comparative Examples (prior to solvent B removal)

| | | Units: mass % | Comparative Example 1 | 2 | 3 | 4 | 5 | 6 |
|---|---|---|---|---|---|---|---|---|
| Continuous phase | Solvent A | Isopar M | 68.5 | 68.5 | 68.5 | 68.5 | 68.5 | 68.5 |
| | Basic dispersant | S17000 | 1.5 | 1.5 | 1.5 | 1.5 | 1.5 | 1.5 |
| | | S11200 (non-volatile fraction 50%) | | | | | | |

TABLE 4-continued

Formulations of oil-in-oil emulsions of Comparative Examples (prior to solvent B removal)

| | | Units: mass % | Comparative Example | | | | | |
|---|---|---|---|---|---|---|---|---|
| | | | 1 | 2 | 3 | 4 | 5 | 6 |
| Dispersed phase | Additive | Dicyclohexylamine | | | | | | |
| | Solvent B | Methanol | 22.5 | 21.5 | 23.5 | 21.5 | 22.5 | 22.5 |
| | Colorant | Black metal complex dye Valifast Black 3810 | 2.5 | 2.5 | 2.5 | 2.5 | 2.5 | |
| | | Black metal complex dye Valifast Black 3830 | | | | | | 2.5 |
| | Acidic compound | BYK111 (non-volatile fraction 95%) | 2.5 (2.4) | 3.5 (3.4) | 2.5 (2.4) | 2.5 (2.4) | 2.5 (2.4) | 2.5 (2.4) |
| | Solid resin | Polyvinyl alcohol JMR-8L | 2.5 | 2.5 | 1.5 | 3.5 | | 2.5 |
| | | Polyvinyl alcohol JMR-10L | | | | | 2.5 | |
| Total (mass %) | | | 100.0 | 100.0 | 100.0 | 100.0 | 100.0 | 100.0 |

The components shown in each of the tables are described below.

(Continuous Phase)

Isopar M: an isoparaffin-based hydrocarbon-based solvent, manufactured by TonenGeneral Sekiyu K.K.

Basic dispersant "S17000": Solsperse 17000 manufactured by Lubrizol Japan Ltd., non-volatile fraction 100%, base value 2 mgKOH/g.

Basic dispersant "S11200": Solsperse 11200 manufactured by Lubrizol Japan Ltd., non-volatile fraction 50%, base value 37 mgKOH/g.

Dicyclohexylamine: manufactured by Wako Pure Chemical Industries, Ltd.

(Dispersed Phase)

Methanol: an alcohol-based solvent having a carbon number of 1, manufactured by Wako Pure Chemical Industries, Ltd.

Black metal complex dye: "Valifast Black 3810" manufactured by Orient Chemical Industries Co., Ltd.

Black metal complex dye: "Valifast Black 3830" manufactured by Orient Chemical Industries Co., Ltd.

Red acid dye: "Water Red 27" manufactured by Orient Chemical Industries Co., Ltd.

Red metal complex dye: "Orasol Pink 5BLG" manufactured by BASF Japan Ltd.

Red salt-forming dye: "Valifast Red 1308" manufactured by Orient Chemical Industries Co., Ltd.

Dye lake pigment: "Seikalight Magenta 2R" manufactured by Dainichiseika Color & Chemicals Mfg. Co., Ltd.

Acidic compound "BYK111": a liquid organic compound having two phosphoric acid groups (a phosphate ester compound having phosphoric acid groups at both terminals of a copolymer), "DISPERBYK-111" manufactured by BYK-Chemie Japan K.K., acid value 129 mgKOH/g, non-volatile fraction 95.0%.

Polyvinyl alcohol 1: degree of saponification 2.7 mol %, weight-average molecular weight 15,000, "JMR-8L" manufactured by Japan VAM & Poval Co., Ltd.

Polyvinyl alcohol 2: degree of saponification 37.3 mol %, weight-average molecular weight 17,500, "JMR-10L" manufactured by Japan VAM & Poval Co., Ltd.

The solubility of the methanol of the solvent B in the hydrocarbon-based solvent (Isopar M) of the solvent A at 23° C. is 0.4 g/100 g. Further, the boiling point of methanol is 64.7° C., and the 50% distillation point of Isopar M is 234° C.

The basic dispersant and the dicyclohexylamine were dissolved in the solvent A in accordance with the continuous phase blend proportions shown in Table 2 to Table 4, whereas the solubility of each of these components in the solvent B at 23° C. was less than 3 g/100 g.

The solid resins were dissolved in the solvent B in accordance with the dispersed phase blend proportions shown in Table 2 to Table 4, whereas the solubility of the solid resins in the solvent A at 23° C. was less than 3 g/100 g, and the solubility in water at 23° C. was less than 3 g/100 g.

The acidic compound was dissolved in the solvent B in accordance with the dispersed phase blend proportions shown in Table 2 to Table 4, whereas the solubility of the acidic compound in the solvent A at 23° C. was less than 3 g/100 g.

The solubility parameter (HSP value) of each component is detailed below. The units are $MPa/cm^3$. Further, the dispersion parameter $\delta d$, the polar parameter $\delta p$, and the hydrogen bonding parameter $\delta h$ are also shown below.

Solvent A "Isopar M": 16 ($\delta d=16$, $\delta p=0$, $\delta h=0$).

Solvent B "Methanol": 29.6 ($\delta d=15.1$, $\delta p=12.3$, $\delta h=22.3$).

The various solid resins: within a range from 22 to 27 ($\delta d=12$ to 20, $\delta p=5$ to 12, $\delta h=10$ to 20).

The acidic compound: 22 to 27 ($\delta d=12$ to 20, $\delta p=5$ to 12, $\delta h=10$ to 20).

The oxidation-reduction potential (ORP value) of each component is listed below. The units are mV.

Solsperse 17000: the ORP value when dissolved in dodecane at 5.0 mass % was lower than the ORP value when dissolved at 0.5 mass %, and the ORP value when dissolved in dodecane at 5.0 mass % was 325.

Solsperse 11200: the ORP value when dissolved in dodecane at 5.0 mass % was lower than the ORP value when dissolved at 0.5 mass %, and the ORP value when dissolved in dodecane at 5.0 mass % was −85.

DISPERBYK-111: the ORP value when dissolved in methanol at 5.0 mass % was higher than the ORP value when dissolved at 0.5 mass %, and the ORP value when dissolved in methanol at 5.0 mass % was 350.

TABLE 5

Ink formulations of Examples (after solvent B removal) and evaluation results

| | | | Examples | | | | | |
|---|---|---|---|---|---|---|---|---|
| | Units: mass % | | 1 | 2 | 3 | 4 | 5 | 6 |
| Continuous phase | Solvent A | Isopar M | 89.4 | 88.4 | 87.9 | 86.6 | 86.6 | 82.8 |
| | Basic dispersant | S17000 | 2.0 | 1.9 | 1.9 | 3.8 | | |
| | | S11200 (non-volatile fraction 50%) | | | | | 3.8 (1.9) | 7.6 (3.8) |
| | Additive | Dicyclohexylamine | | | 0.1 | 0.6 | | |
| Dispersed phase | Solvent B | Methanol | 0.0 | 0.0 | 0.0 | 0.0 | 0.0 | 0.0 |
| | Colorant | Black metal complex dye Valifast Black 3810 | 3.3 | 3.2 | 3.2 | 3.2 | 3.2 | 3.2 |
| | Acidic compound | BYK111 (non-volatile fraction 95%) | 2.0 (1.9) | 3.2 (3.0) | 3.2 (3.0) | 3.2 (3.0) | 3.2 (3.0) | 3.2 (3.0) |
| | Solid resin | Polyvinyl alcohol JMR-8L | 3.3 | 3.2 | 3.2 | 3.2 | 3.2 | 3.2 |
| | | Polyvinyl alcohol JMR-10L | | | | | | |
| Total (mass %) | | | 100.0 | 100.0 | 100.0 | 100.0 | 100.0 | 100.0 |
| Amount of non-volatile fraction (mass %) | | | 10.5 | 11.3 | 11.3 | 13.2 | 11.3 | 13.2 |
| Evaluations | Average particle size [nm] | | 180 | 150 | 150 | 150 | 120 | 110 |
| | Oxidation-reduction potential (mV) | | 290 | 240 | 0 | 290 | 260 | 200 |
| | Δh | | B | A | A | B | B | A |
| | ΔE | | B | A | A | B | A | A |
| | Rub fastness after standing for 1 day | | A | A | A | A | A | B |
| | Storage stability at 70° C. (precipitation) | | B | A | A | B | AA | AA |
| | Water resistance after standing for 1 day | | A | A | A | A | A | A |

TABLE 6

Ink formulations of Examples (after solvent B removal) and evaluation results

| | | | Examples | | | | |
|---|---|---|---|---|---|---|---|
| | Units: mass % | | 7 | 8 | 9 | 10 | 11 |
| Continuous phase | Solvent A | Isopar M | 88.5 | 88.4 | 88.4 | 86.6 | 86.6 |
| | Basic dispersant | S17000 | 1.9 | 1.9 | 1.9 | | |
| | | S11200 (non-volatile fraction 50%) | | | | 3.8 (1.9) | 3.8 (1.9) |
| | Additive | Dicyclohexylamine | | 0.1 | 0.1 | | |
| Dispersed phase | Solvent B | Methanol | 0.0 | 0.0 | 0.0 | 0.0 | 0.0 |
| | Colorant | Red acid dye Water Red 27 | 3.2 | | | | |
| | | Red metal complex dye Orasol Pink 5BLG | | 3.2 | | | |
| | | Red salt-forming dye Valifast Red 1308 | | | 3.2 | | |
| | | Dye lake pigment Seikalight Magenta 2R | | | | 3.2 | |
| | | Black metal complex dye Valifast Black 3830 | | | | | 3.2 |
| | Acidic compound | BYK111 (non-volatile fraction 95%) | 3.2 (3.0) | 3.2 (3.0) | 3.2 (3.0) | 3.2 (3.0) | 3.2 (3.0) |
| | Solid resin | Polyvinyl alcohol JMR-8L | 3.2 | 3.2 | 3.2 | 3.2 | 3.2 |
| | | Polyvinyl alcohol JMR-10L | | | | | |
| Total (mass %) | | | 100.0 | 100.0 | 100.0 | 100.0 | 100.0 |

TABLE 6-continued

Ink formulations of Examples (after solvent B removal) and evaluation results

| | | Examples | | | | |
|---|---|---|---|---|---|---|
| Units: mass % | | 7 | 8 | 9 | 10 | 11 |
| Amount of non-volatile fraction (mass %) | | 11.3 | 11.3 | 11.3 | 11.3 | 11.3 |
| Evaluations | Average particle size [nm] | 150 | 220 | 170 | 240 | 130 |
| | Oxidation-reduction potential (mV) | 230 | 250 | 235 | 110 | 270 |
| | Δh | A | A | A | A | B |
| | ΔE | A | A | A | B | A |
| | Rub fastness after standing for 1 day | A | A | A | A | A |
| | Storage stability at 70° C. (precipitation) | A | A | A | B | AA |
| | Water resistance after standing for 1 day | B | A | A | A | A |

TABLE 7

Ink formulations of Comparative Examples (after solvent B removal) and evaluation results

| | | | Comparative Example | | | | | |
|---|---|---|---|---|---|---|---|---|
| Units: mass % | | | 1 | 2 | 3 | 4 | 5 | 6 |
| Continuous phase | Solvent A | Isopar M | 88.5 | 87.2 | 89.4 | 87.2 | 88.5 | 88.5 |
| | Basic dispersant | S17000 | 1.9 | 1.9 | 2.0 | 1.9 | 1.9 | 1.9 |
| | | S11200 (non-volatile fraction 50%) | | | | | | |
| | Additive | Dicyclohexylamine | | | | | | |
| Dispersed phase | Solvent B | Methanol | 0.0 | 0.0 | 0.0 | 0.0 | 0.0 | 0.0 |
| | Colorant | Black metal complex dye Valifast Black 3810 | 3.2 | 3.2 | 3.3 | 3.2 | 3.2 | |
| | | Black metal complex dye Valifast Black 3830 | | | | | | 3.2 |
| | Acidic compound | BYK111 (non-volatile fraction 95%) | 3.2 (3.0) | 4.5 (4.2) | 3.3 (3.1) | 3.2 (3.0) | 3.2 (3.0) | 3.2 (3.0) |
| | Solid resin | Polyvinyl alcohol JMR-8L | 3.2 | 3.2 | 2.0 | 4.5 | | 3.2 |
| | | Polyvinyl alcohol JMR-10L | | | | | 3.2 | |
| Total (mass %) | | | 100.0 | 100.0 | 100.0 | 100.0 | 100.0 | 100.0 |
| Amount of non-volatile fraction (mass %) | | | 11.3 | 12.5 | 10.4 | 12.5 | 11.3 | 11.3 |
| Evaluations | Average particle size [nm] | | 140 | 160 | 160 | 180 | 150 | 160 |
| | Oxidation-reduction potential (mV) | | 310 | 330 | 305 | 340 | 310 | 380 |
| | Δh | | C | C | C | C | C | C |
| | ΔE | | C | C | C | C | C | C |
| | Rub fastness after standing for 1 day | | A | B | B | A | A | A |
| | Storage stability at 70° C. (precipitation) | | B | B | B | B | B | B |
| | Water resistance after standing for 1 day | | A | A | A | A | A | A |

<Evaluations>

Using each of the inks described above, each of the following evaluations was performed. The results are shown in each of the tables.

(Oxidation-Reduction Potential)

The oxidation-reduction potential (ORP) of each ink was measured at 23° C. using a portable pH meter "pH-208" and an ORP electrode "ORP-14" (both manufactured by FUSO Co., Ltd.).

($\Delta h$ Value)

For each of the prepared inks, a 70° C. accelerated test was performed, printed items were prepared using the ink before and after the test, the L* value, a* value and b* value of the printed items before and after the test were measured, and the hue difference $\Delta h$ was calculated.

The 70° C. accelerated test used an incubator SLI-1201 (manufactured by Tokyo Rikakikai Co., Ltd.). Each ink was placed in a glass bottle, and the bottle was sealed and stored for one week in the incubator set to 70° C.

Printing was performed by mounting each of the inks in a line-type inkjet printer "Orphis-X9050" (manufactured by Riso Kagaku Corporation), and then printing a solid image onto a high-quality coated paper "Aurora Coated Paper" (manufactured by Nippon Paper Industries Co., Ltd.). The printing was performed at a resolution of 300×300 dpi, under discharge conditions including an ink volume per dot of 42 pl. The "Orphis X9050" is a system that uses a line-type inkjet head, wherein the paper is transported in a sub-scanning direction perpendicular to the main scanning direction (the direction along which the nozzles are aligned) while printing is conducted.

Using a spectroscopic color difference meter (TC-1800, Mk-II model, manufactured by Tokyo Denshoku Co., Ltd.), the a* value and the b* value were measured for the printed item printed using the ink before the 70° C. accelerated test, and the printed item printed using the ink after the 70° C. accelerated test. The hue difference $\Delta h$ value was then calculated from these measured values using the formula shown below, and evaluated against the following criteria.

$$h=\tan{-1}(b^*/a^*)(\text{rad})$$

$$h=\tan{-1}(b^*/a^*)/\pi \times 180 (\text{degree})$$

$$\Delta h=|h(\text{before accelerated test})-h(\text{after accelerated test})|$$

A: $\Delta h$ less than 10
B: $\Delta h$ at least 10 but less than 20
C: $\Delta h$ 20 or greater ($\Delta E$ Value)

For each of the prepared inks, a 70° C. accelerated test was performed, printed items were prepared using the ink before and after the test, and the $\Delta E$ value for the printed items was measured.

The 70° C. accelerated test and the printing method were performed in the same manner as that described above for the $\Delta h$ value test.

Using a spectroscopic color difference meter (TC-1800, Mk-II model, manufactured by Tokyo Denshoku Co., Ltd.), the $\Delta E$ value was measured for the printed item printed using the ink before the 70° C. accelerated test and the printed item printed using the ink after the 70° C. accelerated test. The $\Delta E$ value was evaluated against the following criteria.

A: $\Delta E$ less than 6
B: $\Delta E$ at least 6 but less than 10
C: $\Delta E$ 10 or greater (Rub Fastness)

A printed item was obtained using the same printing method as that described above for the $\Delta h$ value test. Following standing for 24 hours (1 day) after printing, the solid image portion of the printed item was rubbed strongly 5 times with a finger. The state of the printed item was then inspected visually, and the rub fastness was evaluated against the following criteria.

A: almost no separation of the image could be detected.
B: minor separation of the image was confirmed, but not problematic in actual use.
C: marked separation of the image occurred, at a level problematic for actual use.

(Storage Stability)

Each of the inks was placed in a glass bottle, and the bottle was sealed and stored at 70° C. After storage for 2 weeks, the ink was inspected visually for the amount of precipitation, and the storage stability was evaluated against the following criteria.

A: no precipitation.
B: a small amount of fluid precipitate.
C: non-fluid precipitate.

(Water Resistance)

A printed item was obtained using the same printing method as that described above for the $\Delta h$ value test. Following standing for 24 hours (1 day) after printing, 0.5 ml of water was dripped onto the solid image portion of the printed item, the level of bleeding was observed visually, and the water resistance was evaluated against the following criteria.

A: no bleeding of the printed image portion.
B: minor bleeding of the printed image portion, but not problematic in actual use.
C: bleeding of the printed image portion, at a level problematic for actual use.

(Average Particle Size of Colored Resin Particles)

For each of the inks described above, the volume-based average particle size of the colored resin particles dispersed in the ink was measured using a dynamic light scattering particle size distribution analyzer "LB-500" (manufactured by Horiba, Ltd.).

As is evident from the tables shown above, the ink of each example exhibited favorable results for all the evaluations, and furthermore, the average particle size of the colored resin particles also fell within an appropriate range.

In Examples 2 and 3, the oxidation-reduction potential (ORP) was lower than that of Examples 1 and 4, and it is evident from the evaluation results for $\Delta h$ and $\Delta E$ that the change in the color tone was less. The storage stability was also improved.

Examples 5 and 6 used a different type of basic dispersant. The basic dispersant from Examples 5 and 6 exhibited a higher solubility in the solvent A.

In Examples 5 and 6, the oxidation-reduction potential was lower, and it is evident from the evaluation results for $\Delta h$ and $\Delta E$ that the change in the color tone was less. The storage stability was also improved.

Examples 7 to 11 used different types of colorant.

Regardless of which type of colorant was used, restricting the oxidation-reduction potential to 300 mV or less yielded favorable results for all the evaluations.

In each of the comparative examples, the oxidation-reduction potential was high, and it is evident from the evaluation results for $\Delta h$ and $\Delta E$ that the change in the color tone was much greater.

It is to be noted that, besides those already mentioned above, many modifications and variations of the above embodiments may be made without departing from the novel and advantageous features of the present invention. Accordingly, all such modifications and variations are intended to be included within the scope of the appended claims.

The invention claimed is:

1. A colored resin particle dispersion comprising: colored resin particles; a basic dispersant; and a non-aqueous solvent,
wherein the colored resin particles comprise a colorant, a solid resin and a liquid organic compound having an acidic group,
a mass ratio of the liquid organic compound having an acidic group to the colorant is not less than 0.5, and
an oxidation-reduction potential of the colored resin particle dispersion is 300 mV or less.

2. The colored resin particle dispersion according to claim 1, wherein the colorant comprises a dye and/or a dye lake pigment.

3. The colored resin particle dispersion according to claim 2, wherein the colorant comprises a dye.

4. The colored resin particle dispersion according to claim 2, wherein the colorant comprises a dye lake pigment.

5. The colored resin particle dispersion according to claim 1, wherein the colorant comprises a metal complex dye.

6. The colored resin particle dispersion according to claim 1, wherein the acidic group of the liquid organic compound having an acidic group comprises a phosphoric acid group.

7. An inkjet ink comprising the colored resin particle dispersion according to claim 1.

* * * * *